US010565127B2

(12) United States Patent
Dong et al.

(10) Patent No.: US 10,565,127 B2
(45) Date of Patent: Feb. 18, 2020

(54) APPARATUS AND METHOD FOR MANAGING A VIRTUAL GRAPHICS PROCESSOR UNIT (VGPU)

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/815,511

(22) Filed: Nov. 16, 2017

(65) Prior Publication Data
US 2018/0210840 A1 Jul. 26, 2018

Related U.S. Application Data

(63) Continuation of application No. 14/780,401, filed as application No. PCT/CN2014/094663 on Dec. 23, 2014, now Pat. No. 9,824,026.

(51) Int. Cl.
*G06F 12/00* (2006.01)
*G06F 12/08* (2016.01)
(Continued)

(52) U.S. Cl.
CPC ............ *G06F 12/109* (2013.01); *G06F 9/455* (2013.01); *G06F 9/45533* (2013.01);
(Continued)

(58) Field of Classification Search
CPC . G06F 9/455; G06F 9/45533; G06F 2212/656
(Continued)

(56) References Cited

U.S. PATENT DOCUMENTS 6,782,410 B1  8/2004  Bhagat et al.
6,842,377 B2  1/2005  Takano et al.
(Continued)

FOREIGN PATENT DOCUMENTS

CN  103389945 A  11/2013
CN  103440208 A  12/2013
CN  104111896 A  10/2014

OTHER PUBLICATIONS

Examination Report under Section 18(3) from foreign counterpart Great Britain Patent Application No. 1519383.2, dated Feb. 26, 2018, 2 pages.
(Continued)

*Primary Examiner* — Mohamed M Gebril
(74) *Attorney, Agent, or Firm* — Nicholson De Vos Webster & Elliott LLP

(57) ABSTRACT

An apparatus and method are described for managing a virtual graphics processor unit (GPU). For example, one embodiment of an apparatus comprises: a dynamic addressing module to map portions of an address space required by the virtual machine to matching free address spaces of a host if such matching free address spaces are available, and to select non-matching address spaces for those portions of the address space required by the virtual machine which cannot be matched with free address spaces of the host; and a balloon module to perform address space ballooning (ASB) techniques for those portions of the address space required by the virtual machine which have been mapped to matching address spaces of the host; and address remapping logic to perform address remapping techniques for those portions of the address space required by the virtual machine which have not been mapped to matching address spaces of the host.

23 Claims, 22 Drawing Sheets

(51) Int. Cl.
| | |
|---|---|
| *G06F 13/00* | (2006.01) |
| *G06F 12/109* | (2016.01) |
| *G06F 12/02* | (2006.01) |
| *G06F 9/455* | (2018.01) |
| *G06F 9/50* | (2006.01) |
| *G06T 1/20* | (2006.01) |
| *G06T 1/60* | (2006.01) |

(52) U.S. Cl.
CPC ............ *G06F 9/45558* (2013.01); *G06F 9/50* (2013.01); *G06F 9/5016* (2013.01); *G06F 12/02* (2013.01); *G06T 1/20* (2013.01); *G06T 1/60* (2013.01); *G06F 2009/45583* (2013.01); *G06F 2212/657* (2013.01); *G06T 2200/28* (2013.01)

(58) Field of Classification Search
USPC .......................................................... 711/203
See application file for complete search history.

(56) References Cited

U.S. PATENT DOCUMENTS

| | | | |
|---|---|---|---|
| 7,017,011 | B2 | 3/2006 | Lesmanne et al. |
| 7,196,942 | B2 | 3/2007 | Khurana et al. |
| 7,269,715 | B2 | 9/2007 | Le et al. |
| 7,321,955 | B2 | 1/2008 | Ohmura |
| 7,512,736 | B1 | 3/2009 | Overby |
| 7,702,843 | B1 | 4/2010 | Chen et al. |
| 8,230,193 | B2 | 7/2012 | Klemm et al. |
| 2004/0068621 | A1 | 4/2004 | Van Doren |
| 2005/0125607 | A1 | 6/2005 | Chefalas et al. |
| 2006/0202999 | A1* | 9/2006 | Thornton .............. G06F 12/145 345/531 |
| 2007/0008328 | A1 | 1/2007 | MacWilliams et al. |
| 2009/0094413 | A1 | 4/2009 | Lehr et al. |
| 2009/0228648 | A1 | 9/2009 | Wack |
| 2009/0282101 | A1 | 11/2009 | Lim et al. |
| 2010/0046267 | A1 | 2/2010 | Yan et al. |
| 2010/0050016 | A1 | 2/2010 | Franklin et al. |
| 2010/0125712 | A1 | 5/2010 | Murase et al. |
| 2010/0241785 | A1* | 9/2010 | Chen ..................... G06F 9/5016 711/6 |
| 2010/0332780 | A1 | 12/2010 | Furuya |
| 2011/0202735 | A1 | 8/2011 | Kono et al. |
| 2011/0307745 | A1 | 12/2011 | McCune et al. |
| 2012/0110293 | A1* | 5/2012 | Yang .................. G06F 9/45558 711/170 |
| 2012/0124305 | A1* | 5/2012 | Weissman ........... G06F 12/0223 711/160 |
| 2012/0185668 | A1 | 7/2012 | Joo |
| 2012/0198107 | A1 | 8/2012 | McKean et al. |
| 2012/0290765 | A1* | 11/2012 | Durrant ................ G06F 12/023 711/6 |
| 2013/0007373 | A1 | 1/2013 | Beckmann et al. |
| 2013/0067161 | A1 | 3/2013 | Chandra et al. |
| 2013/0339568 | A1 | 12/2013 | Corrie |
| 2014/0108700 | A1 | 4/2014 | Li et al. |

OTHER PUBLICATIONS

International Preliminary Report on Patentability for Application No. PCT/CN2014/094663, dated Jul. 6, 2017, 6 pages.
International Search Report and Written Opinion for Application No. PCT/CN2014/094663, dated Sep. 23, 2015, 12 pages.
Non-Final Office Action from U.S. Appl. No. 14/780,401, dated Nov. 17, 2016, 29 pages.
Notice of Allowance from foreign counterpart Taiwan Patent Application No. 104138590, dated Sep. 18, 2017, 3 pages.
Notice of Allowance from U.S. Appl. No. 14/780,401, dated Jul. 14, 2017, 17 pages.
Office Action from foreign counterpart Great Britain Patent Application No. GB1519383, dated May 17, 2016, 6 pages.
Search Report from foreign counterpart Taiwan Patent Application No. 104138590, dated Feb. 2, 2017, 2 pages.
Tian K., et al., "A Full GPU Visualization Solution with Mediated Pass-Through," Proceedings of USENIX ATC' 14: 2014 USENIX Annual Technical Conference, Jun. 19-20, 2014, pp. 121-132.
Notification of Grant from foreign counterpart Great Britain Patent Application No. 1519383.2, dated Oct. 31, 2018, 2 pages.
Notice of Granting Patent Right for Invention from foreign counterpart Chinese Patent Application No. 201480029658.3, dated Dec. 28, 2018, 4 pages.

* cited by examiner

APPARATUS AND METHOD FOR MANAGING A VIRTUAL GRAPHICS PROCESSOR UNIT (VGPU)

BACKGROUND

Field of the Invention

This invention relates generally to the field of computer processors. More particularly, the invention relates to a method and apparatus for managing a virtual graphics processor unit (GPU).

Description of the Related Art

Graphics processor unit (GPU) virtualization has become increasingly important as cloud and data centers share graphics (GFX) hardware among multiple virtual machines (VMs), such as with VDI (Virtual Desktop Infrastructure) use cases. Technology directed at GFX virtualization includes GRID™ platforms developed by NVidia™ and virtual Graphics Technology (vGT)™ platforms developed by Intel™. Graphics virtualization has become important in mobile devices as well, such as implemented in the virtualization-based Dual-OS proj ect.

There are typically two methods to support efficient GFX virtualization, referred to as "pass-through" and "mediate pass-through." Pass-through technologies are widely used with input/output memory management unit (IOMMU) technology such as Intel Virtualization Technology for Directed I/O (VT-d) and/or Single Root I/O Virtualization (SRIOV), where the hardware can generate multiple instances of PCI express (PCIe) functions so that each guest can directly access the runtime hardware resources (e.g., memory mapped IO (MMIO) and direct memory access (DMA)). For example, IOMMU technology will remap the guest physical DMA address to the host. However, SRIOV-capable GFX devices require extensive hardware modification and/or circuit budget and, as a result, examples of this technology have not appeared in any significant devices or platforms.

Mediate pass-through tweaks the solution a bit, by using the software to emulate the access of less performance-critical resources (e.g., MMIO registers) from the guest, but to pass-through performance-critical resource access, such as aperture and rendering commands. For example, guest aperture access may go directly to hardware, and the guest rendering commands may be directly executed by the GPU.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
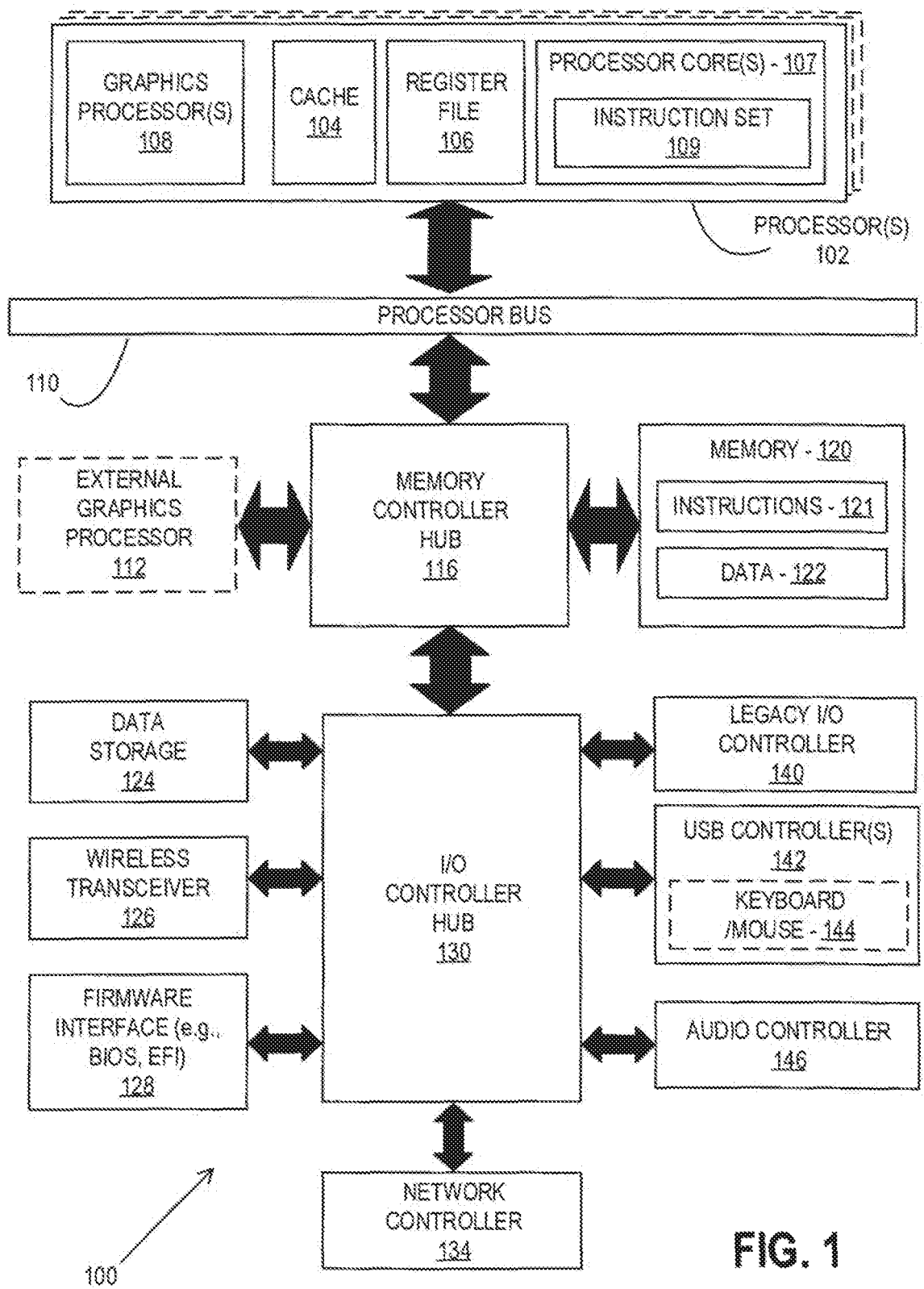
FIG. 1 is a block diagram of an embodiment of a computer system with a processor having one or more processor cores and graphics processors.

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
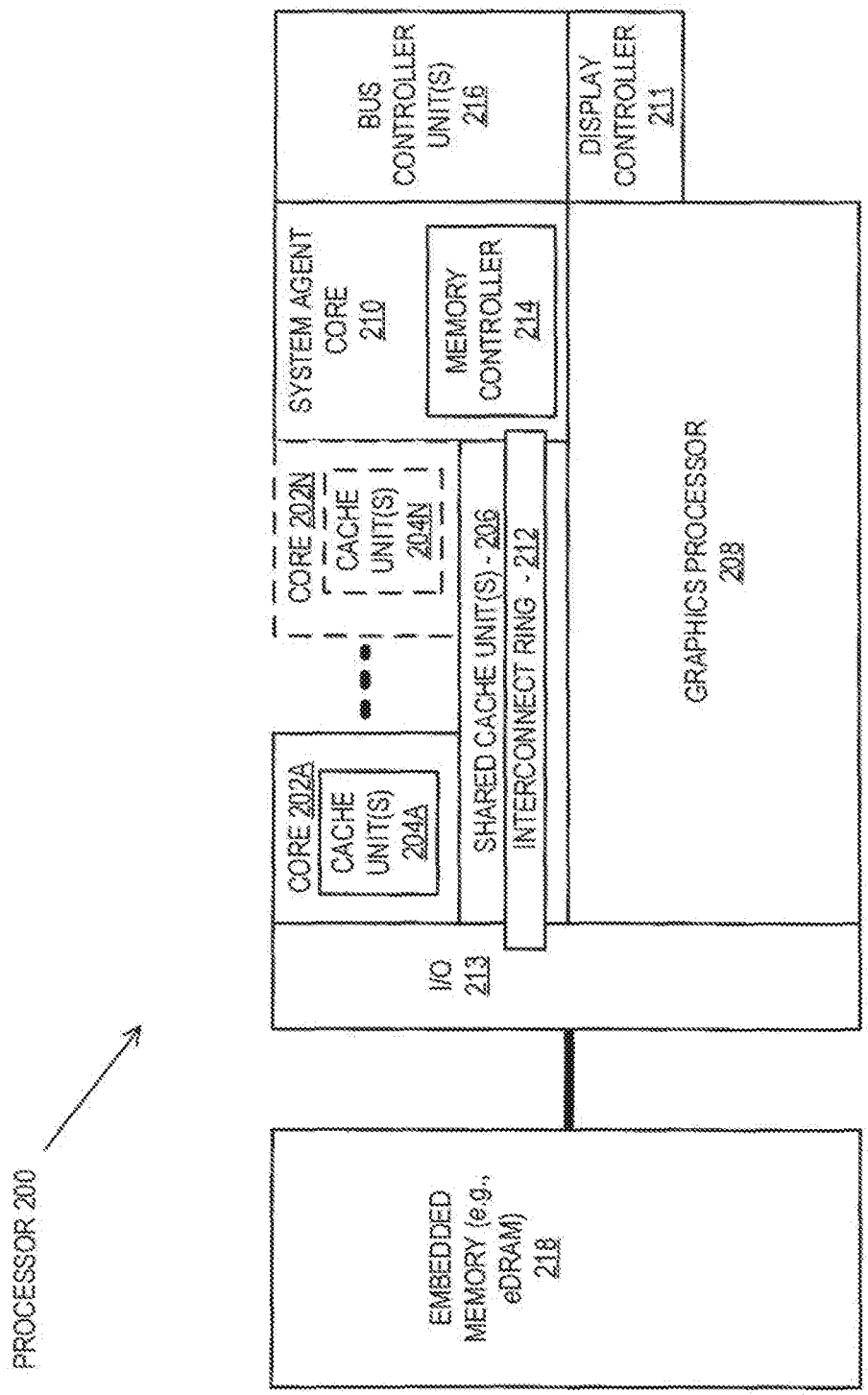
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as an SoC integrated circuit having the illustrated components, in addition to other components.

Figure 3:
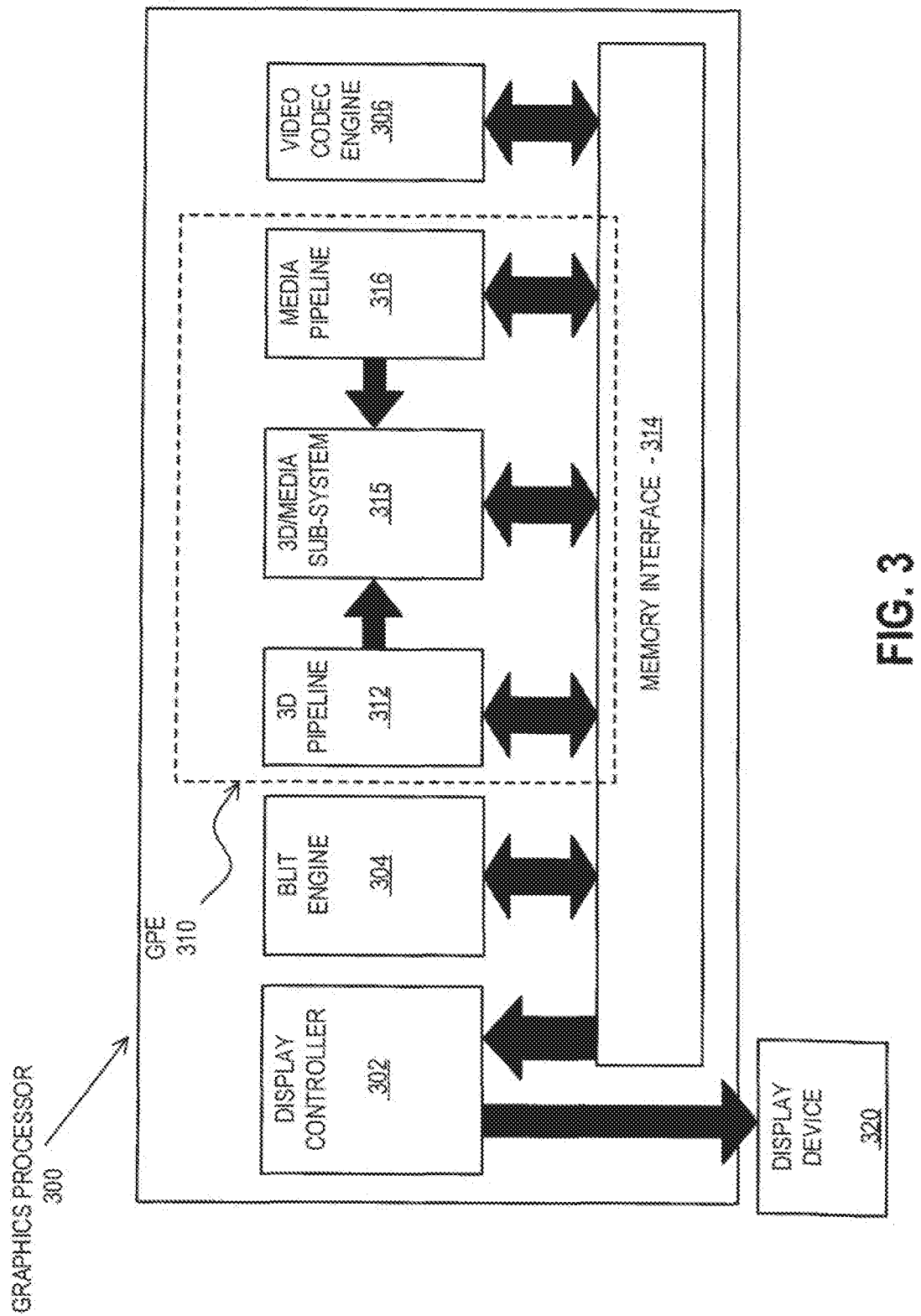
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
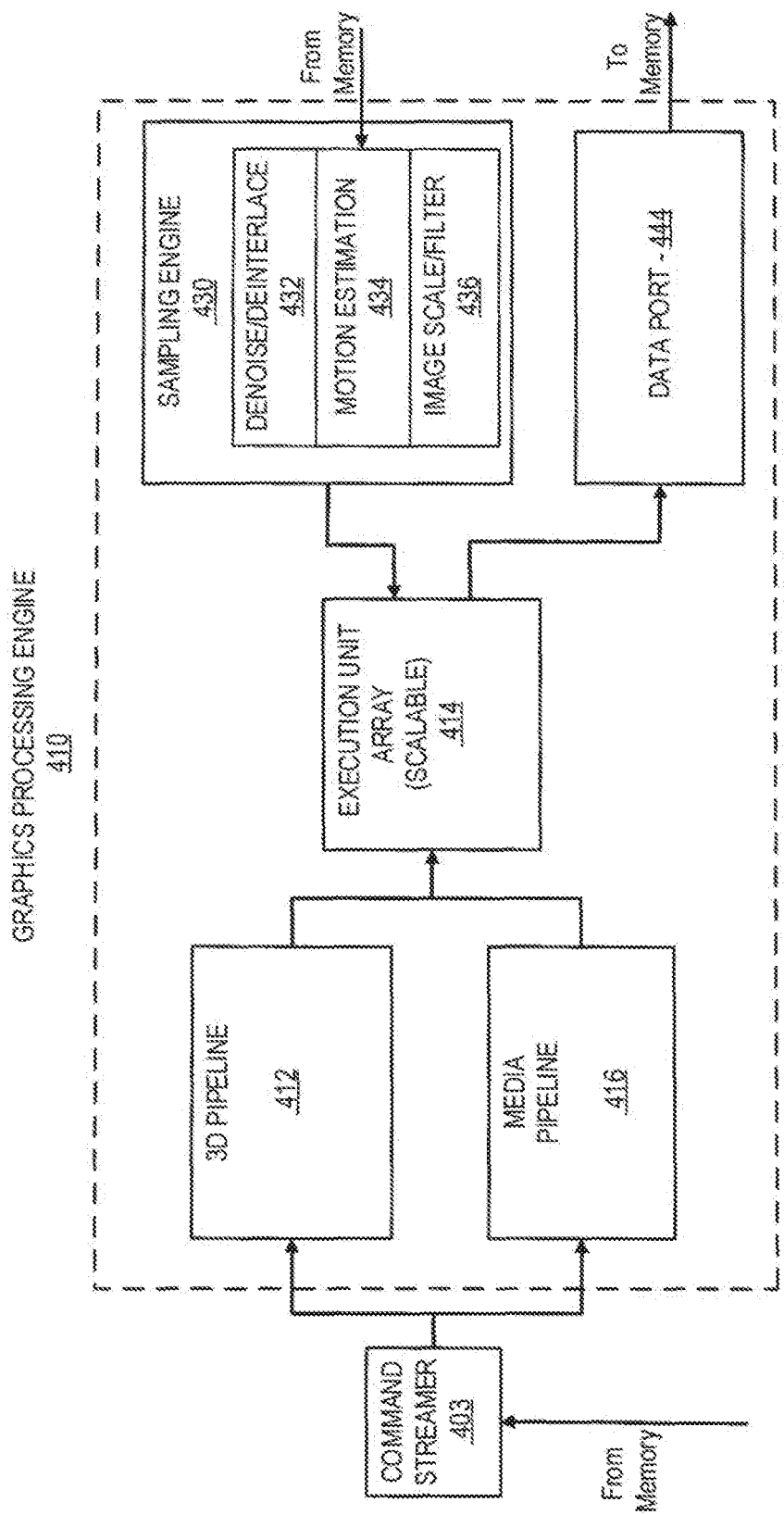
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
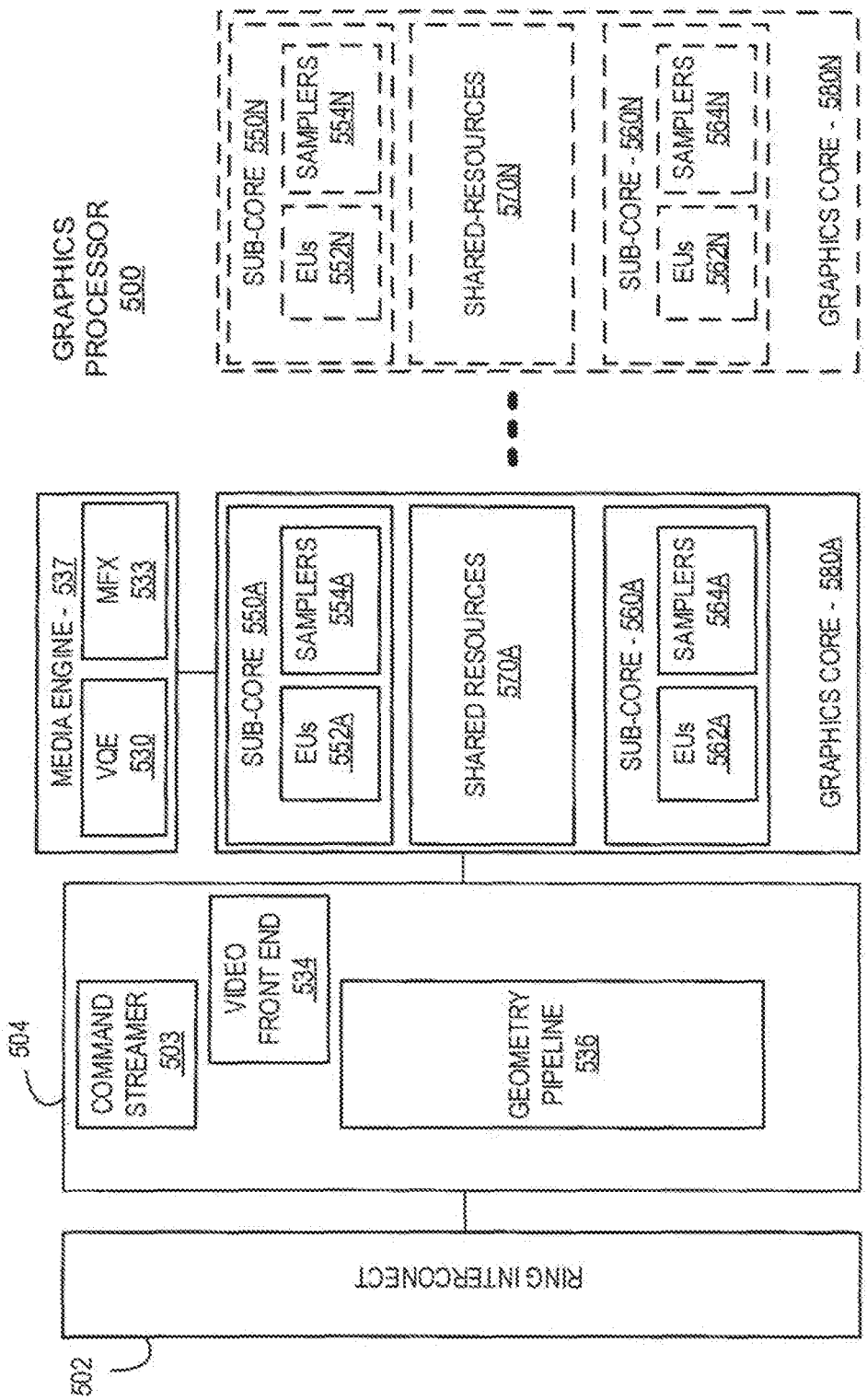
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
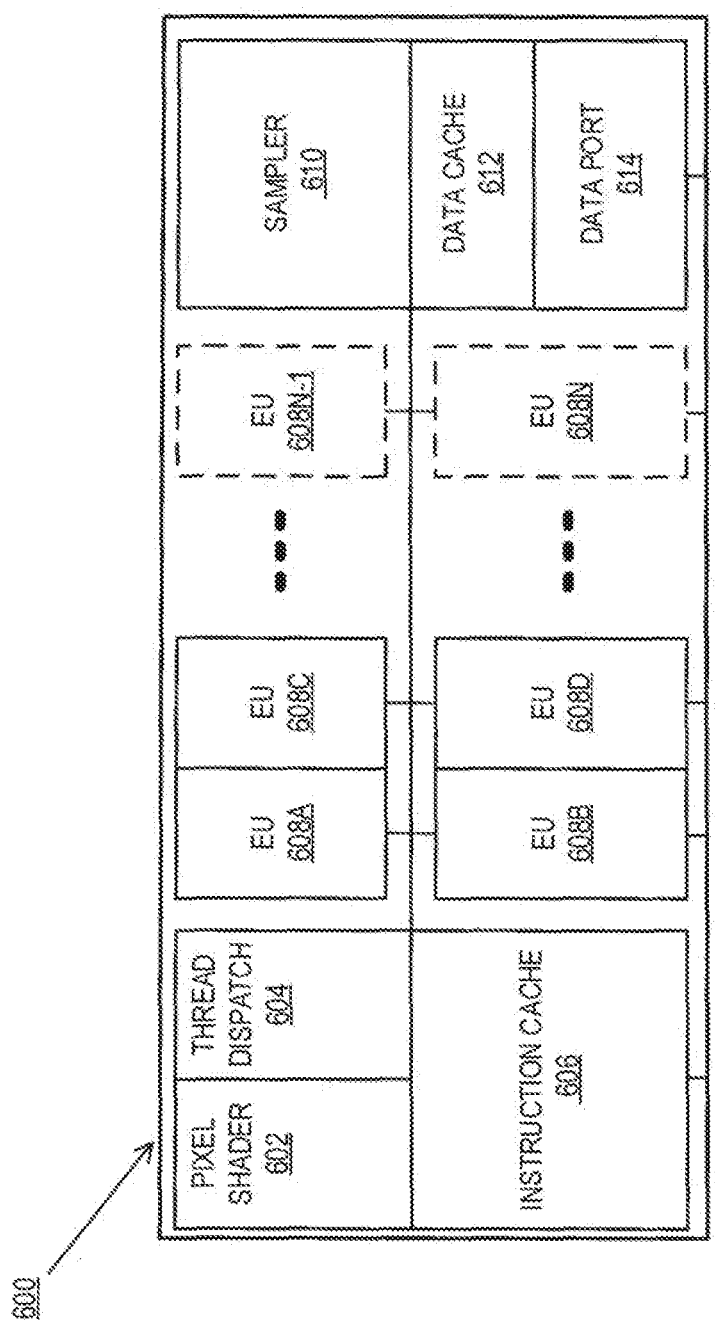
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
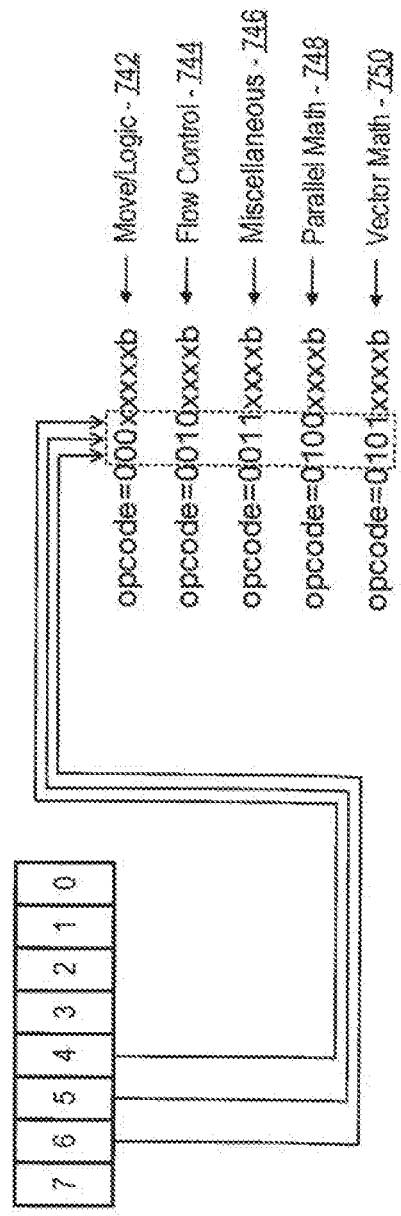
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes access/address mode information 726 specifying, for example, whether direct register addressing mode or indirect register addressing mode is used. When direct register addressing mode is used, the register address of one or more operands is directly provided by bits in the instruction 710. When indirect register addressing mode is used, the register address of one or more operands may be computed based on field 726, which specifies an address register value mode and/or an address immediate field in the instruction. In one embodiment the access/address mode information 726 may determine the operand mode to define a data access alignment for the instruction. For example, when in a first mode, the instruction 710 may use byte-aligned addressing for source and destination operands and, when in a second mode, the instruction 710 may use 16-byte-aligned access mode and 1-byte aligned addressing for all source and destination operands. access mode, where the byte alignment of the access mode determines the access alignment of the instruction operands.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
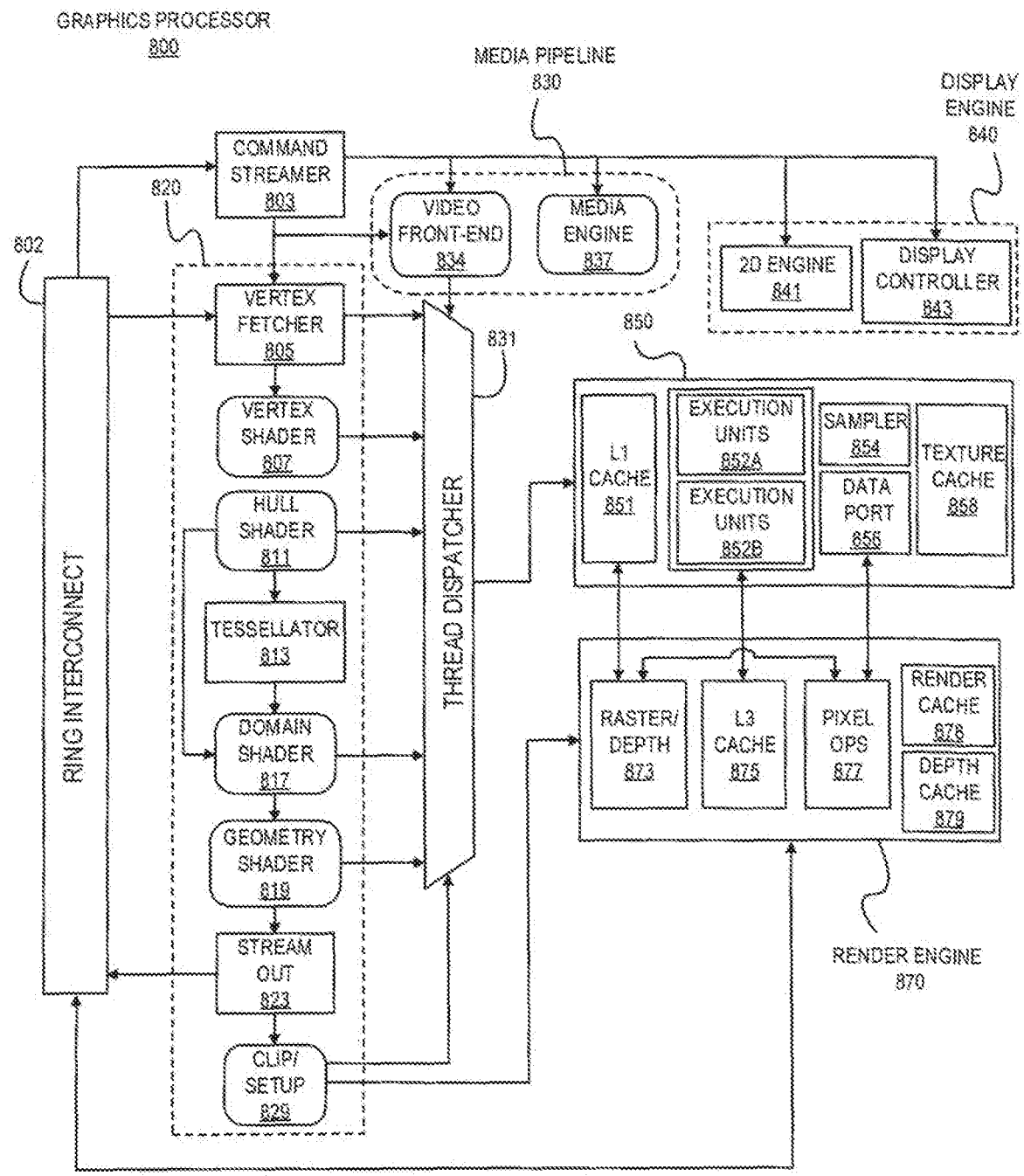
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
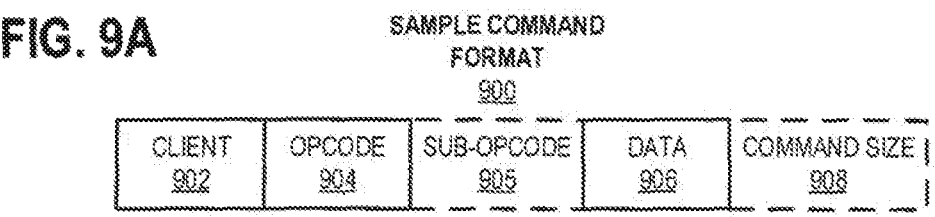
FIG. 9A is a block diagram illustrating a graphics processor command format according to an embodiment.
Figure 9B:
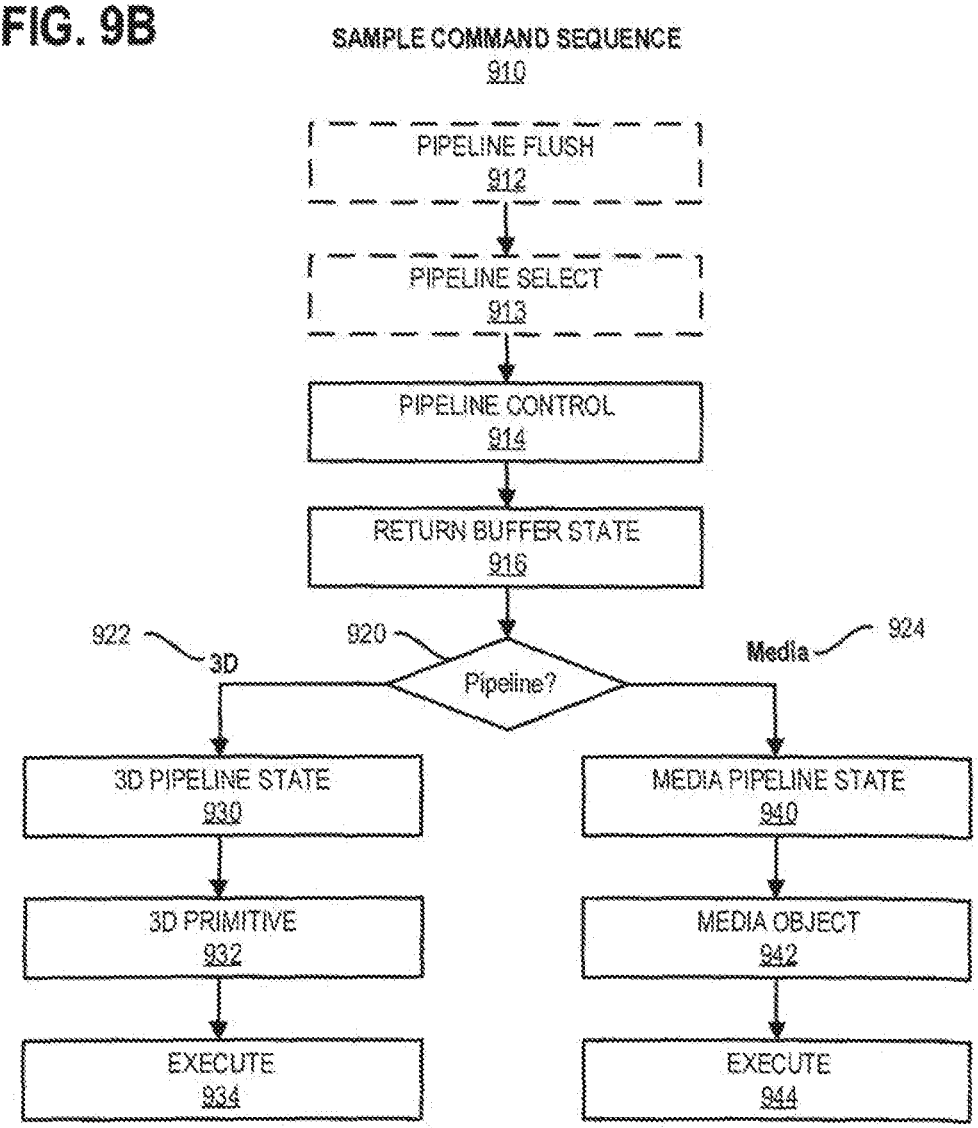
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
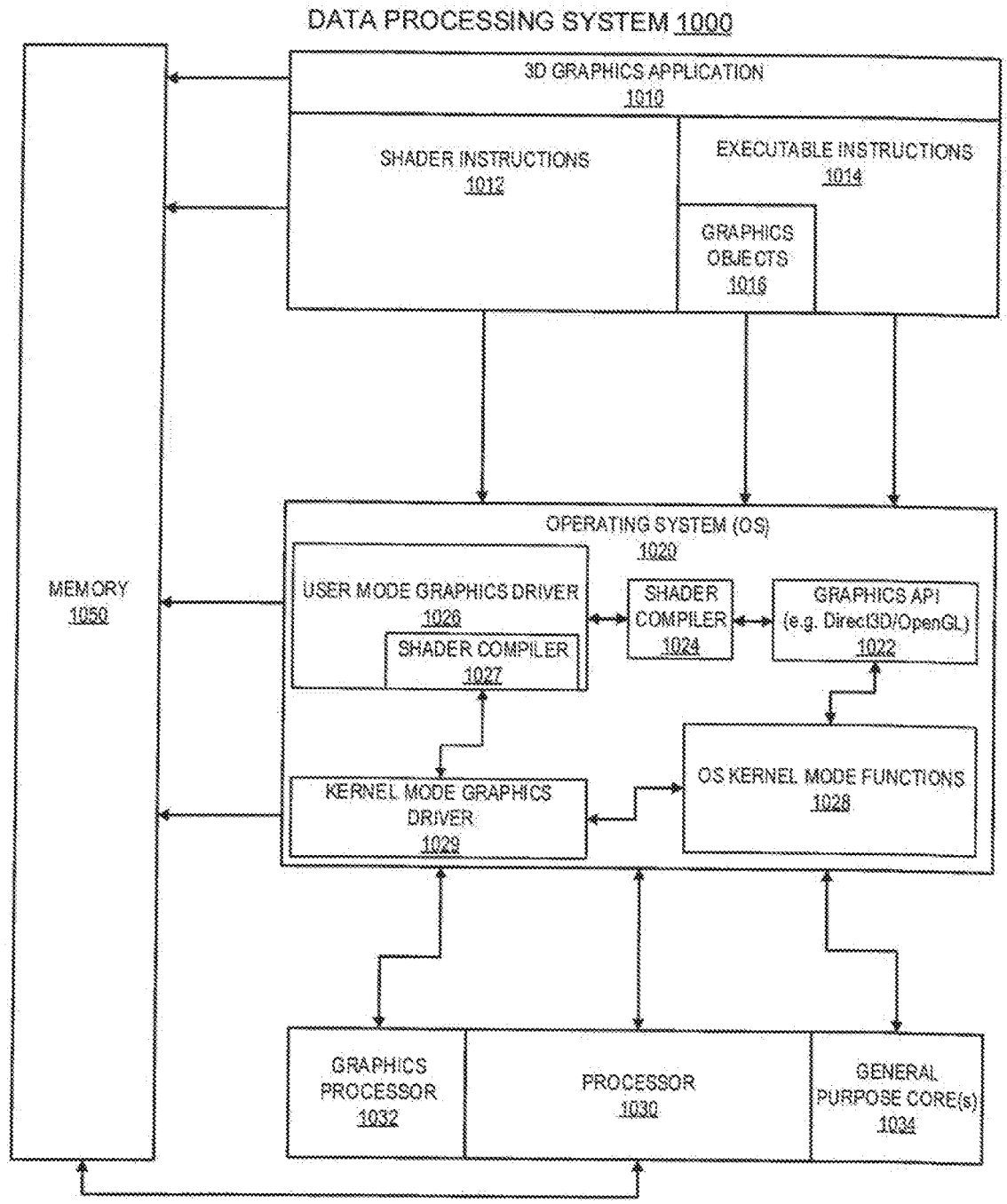
FIG. 10 illustrates exemplary graphics software architecture for a data processing system according to an embodiment.

FIG. 10 illustrates exemplary graphics software architecture 1000 for a data processing system according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Virtualization with Address Ballooning and Address Space Remapping

Figure 11A:
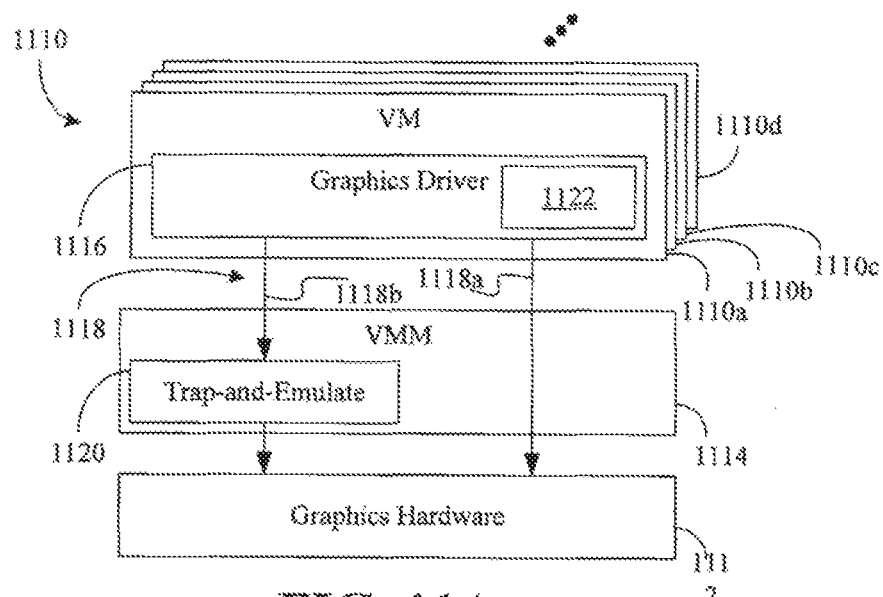
FIGS. 11A-B are block diagrams of examples of graphics virtualization environments according to an embodiment.

Turning now to FIG. 11A, a graphics virtualization environment is shown in which a plurality of virtual machines (VMs) 1110 (1110a-1110d) access graphics hardware 1112 via a virtual machine monitor (VMM) 1114. The graphics hardware 1112 may include, for example, registers and/or memory devices that support the performance of graphics related tasks. Each VM 1110 may function as a self-contained platform, running its own operating system (OS) and/or application software. In the illustrated example, the VM 1110a includes a graphics driver 1116 (e.g., guest software) that conducts various operations 1118 (1118a, 1118b) with respect to the graphics hardware 1112. Other VMs may also include guest software that is specific to the OS configuration of the respective VM.

The operations 1118 may generally relate to the memory mapped input output (MMIO) address operation of graphics related applications such as, for example, gaming applications, video applications, and so forth. In general, graphics memory address space in the graphics hardware 1112 may be partitioned between the VMs 1110 so that the addresses used by each VM 1110 may be directly used by the graphics hardware 1112. In one example, the VM 1110a includes efficiency logic 1122 to identify an assigned address space of the VM 1110a for MMIO operations and balloon the remaining address space that is not assigned to the VM 1110a (e.g., address space assigned to the other VMs). Thus, "ballooning" may involve the VM 1110a cooperatively refraining from using the remaining address space. As will be discussed in greater detail, the VMM 1114 may ensure that the VM 1110a complies with the policy of refraining from using the remaining address space. Such an approach may enable the view of the assigned address space by the VM 1110a (and indeed, the entire graphics memory address space) to be identical to the view of that assigned address space by the VMM 1114 (e.g., VMM address space). The other VMs may also include efficiency logic to balloon their non-assigned address space in a similar fashion. As a result, conventional address remapping and/or address fixing solutions may be eliminated, which may in turn significantly enhance efficiency.

More particularly, a first set 1118a of the operations 1118 (e.g., performance critical operations) may be provided direct access to an aperture region of the graphics hardware 1112, whereas a second set 1118b of the operations 1118 (e.g., non- or less-performance critical operations) may be processed by a trap-and-emulate module 1120 of the VMM 1114 prior to being given access to the MMIO address space of the graphics hardware 1112. The "aperture" region may be part of a graphics processing unit (GPU) graphics memory address space that is mapped to a system memory address space for central processing unit (CPU) accesses. Thus, the entire graphics memory address space (aperture and non-aperture regions) may be accessed by the GPU in the illustrated approach. The operations 1118 may involve, for example, frame buffer access and other guest virtual OS activities. As will be discussed in greater detail, the aperture regions may be partitioned among the VMs 10 so that address remapping and/or address fixing is not needed.

Figure 11B:
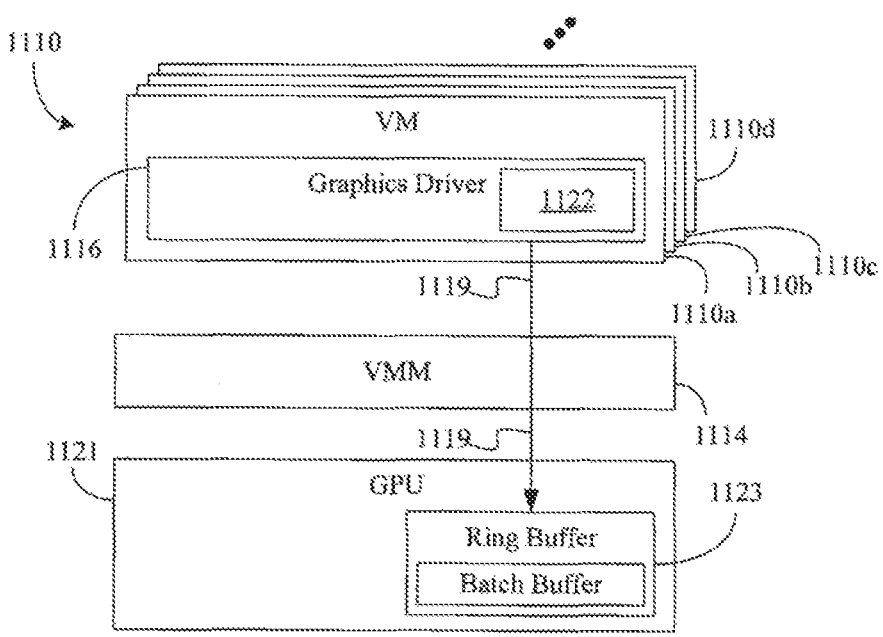

FIG. 11B shows a graphics virtualization environment in which the plurality of VMs 1110 generate commands 1119 that are passed through directly to a graphics processor such as, for example, a GPU 1121. The commands 1119 may include rendering commands, media commands, blitter commands, and so forth, that may be placed in a batch buffer and/or ring buffer 1123 by a host processor such as, for example, a CPU (not shown) running the VMs 1110 and/or the VMM 1114. The GPU 1121 may fetch the commands 1119 from the batch buffer and/or ring buffer 1123 for execution. The batch buffer and/or ring buffer 1123 may therefore enable the CPU to safely send commands to the GPU 1121. In general, the commands 1119 may contain graphic memory addresses (GMAs) that may be considered non-aperture regions of the graphics hardware.

As in the case of the aperture regions associated with the MMIO operations 1118 (FIG. 11A), the non-aperture regions associated with the commands 1119 may be partitioned among the VMs 1110 so that address remapping and/or address fixing is not needed. Moreover, the illustrated efficiency logic 1122 may identify an assigned address space of the VM 1110a for commands and balloon the remaining address space that is not assigned to the VM 1110a (e.g., address space assigned to the other VMs). As already noted, the other VMs may also include efficiency logic to balloon their non-assigned address space in a similar fashion.

Figure 12:
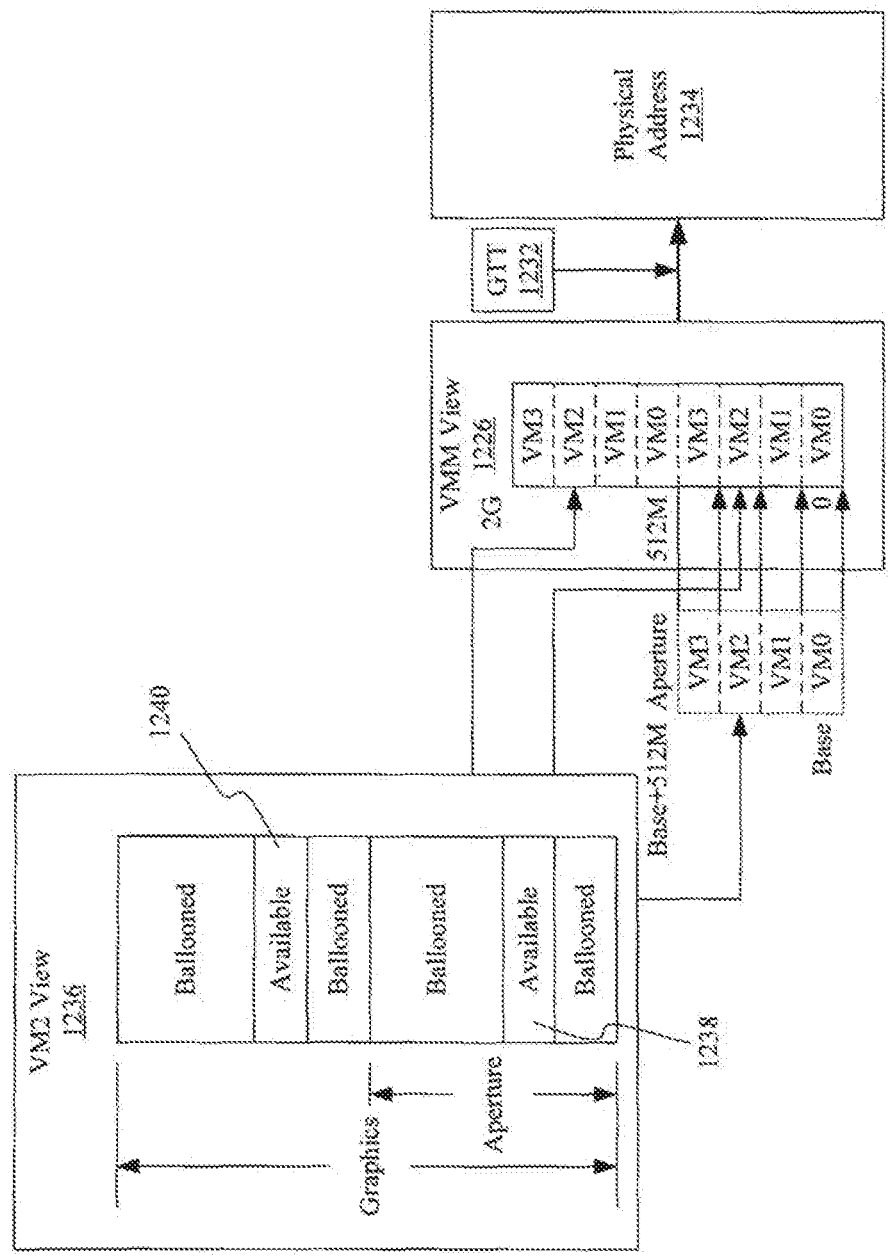
FIG. 12 is a block diagram of an example of an address ballooning approach according to an embodiment.

FIG. 12 shows a partitioning approach in which a VM view 1236 of a graphics memory address space assigned to the VM is identical to a VMM view 1226 of the graphics memory address space. In the illustrated example, a particular VM ("VM2") may issue commands for direct access to an aperture region of the graphics memory address space and direct access to a non-aperture region of the graphics memory address space. In the illustrated example, a graphics translation table (GTT) 1232 maps addresses in the graphics memory address space to addresses in a physical address space 1234 (e.g., system address space) on a system bus associated with the graphics hardware/memory. The illustrated partitioning approach may also apply to other VMs in the system (e.g., VM0, VM1, VM3). For example, the address space not assigned to VM2 may be partitioned among and assigned to VM0, VM1, VM3, etc., so that the other VMs may also issue commands for direct access to an aperture region of the graphics hardware and direct access to a non-aperture region of the graphics hardware.

More particularly, an address ballooning approach is shown in which the VM view 1236 of the graphics memory address space assigned to the VM includes ballooned address spaces. For example, remaining address space other than an assigned address space 1238 in an aperture region may be ballooned so that the VM corresponding to the assigned address space 1238 ("VM2") will not use the remaining address space in the aperture region. Similarly, remaining address space other than an assigned address space 1240 in the non-aperture region may be ballooned so that the VM in question will not use the remaining address space in the non-aperture region. The VMM view 1226 demonstrates that the assigned address spaces 1238, 1240 may be the same from the perspective of both the VM and the VMM. Although the illustrated example shows a single address space in the aperture and non-aperture regions, each VM may also have multiple segments of address space in each region.

Figure 13:
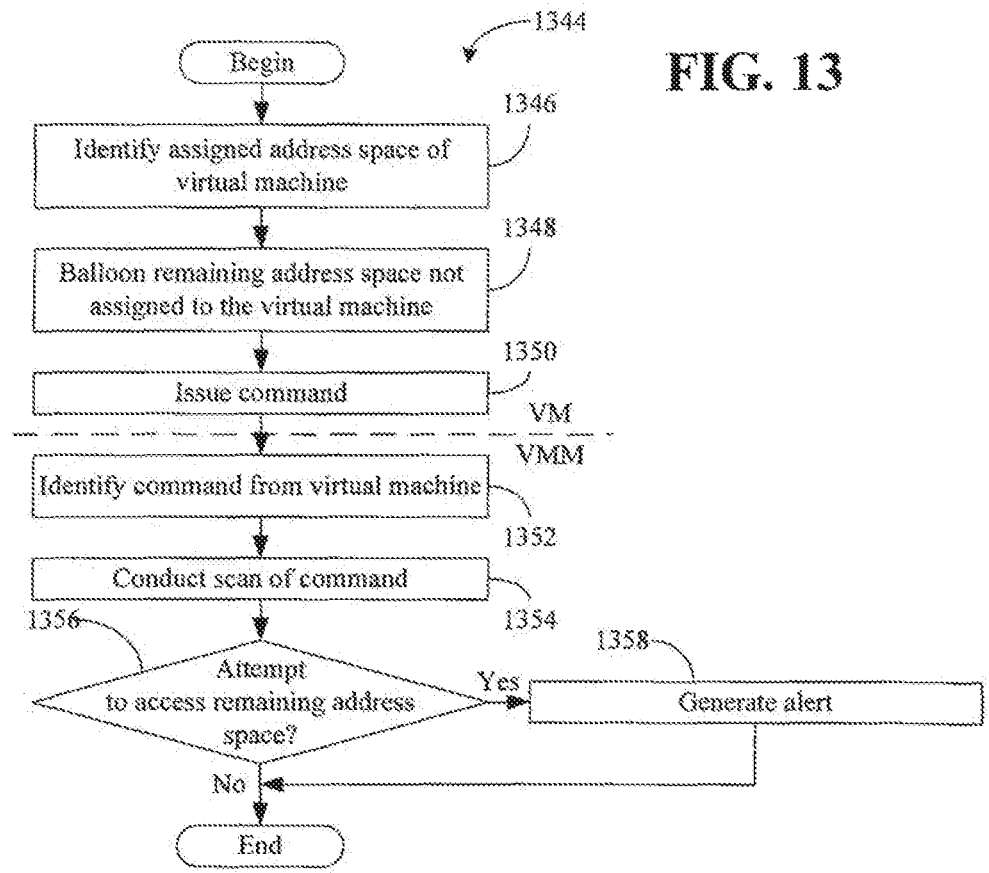
FIG. 13 is a flowchart of an example of a method of managing virtual machines according to an embodiment.

Turning now to FIG. 13, a method 1344 of managing virtual machines is shown. The method 1344 may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 1344 may be written in any combination of one or more programming languages, including an object oriented programming language such as C++ or the like and conventional procedural programming languages, such as the "C" programming language or similar programming languages. Moreover, the method 1344 may be implemented using any of the aforementioned circuit technologies.

Illustrated VM block 1346 identifies an assigned address space of a VM, wherein the assigned address space is associated with a graphics memory address space. The VM and a VMM associated with the VM may use a paravirtualized mechanism to convey information indicating the assigned address space and/or the guest software in the VM may query the VMM (e.g., through hypercall) for the assigned address space. VM block 1348 balloons the remaining address space that is not assigned to that VM. As already noted, such an approach may enable the view of the assigned and ballooned address space by the VM to be identical to the view of the host (or VMM) address space. VM block 1350 may issue a command such as, for example, a frame buffer access, rendering, media and/or blitter command, to the graphics hardware through a batch buffer and/or ring buffer such as, for example the ring buffer 1323 (FIG. 11B), as already discussed.

Illustrated VMM block 1352 provides for identifying the command from the VM, wherein the command may include a rendering command, media command, blitter command, and so forth. In the illustrated example, a scan of the command may be conducted at VMM block 1354, wherein the scan may be conducted via the VMM and/or a hardware boundary checker. A purely VMM-based solution may be considered relatively "lightweight" because no address conversion would be involved.

If it is determined at VMM block 1356 that the command attempts to access the remaining address space in the graphics hardware that is not assigned to the VM in question, illustrated VMM block 1358 may generate an alert (e.g., host processor, central processing unit/CPU interrupt, etc.). If the VM and/or guest software is trusted, the command scan at VMM block 1354 and the determination at VMM block 1356 may be bypassed, in order to improve performance.

With regard to CPU memory accesses, an extended page table (EPT) may be used to protect against accesses outside the assigned address space. For GPU memory accesses, however, a GTT and/or per process GTT (PPGTT) may be used to protect against accesses outside the assigned address space.

Figure 14:
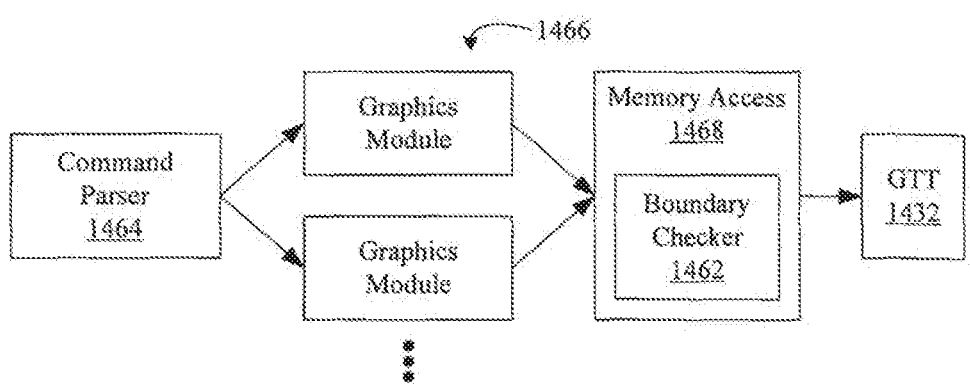
FIG. 14 is a block diagram of an example of an architecture having a hardware boundary checker according to an embodiment.

FIG. 14 shows a graphics processor architecture that uses a hardware boundary checker 1462 to scan VM commands. In the illustrated example, a command parser 1464 parses commands and distributes them to various graphics modules (e.g., rendering engines) 1466, which may in turn issue those commands to a memory access module 1468 containing the hardware boundary checker 1462. In one implementation, the boundary checker 1462 uses lower/upper pair address registers for guest aperture (lower) and non-aperture (upper) regions of the graphics memory address space of the current VM. These address registers may be programmed/restored by the VMM at rendering engine/owner switch time. Thus, the below pseudo code may provide for the alert decision making process.

If ((GMA>=lower_aperture)&& (GMA<upper_aperture)), access OK;
Else if ((GMA>=lower_gmadr)&& (GMA<upper_gmadr)), access OK;
Else access is denied Where "GMA" may refer to the address of a graphics memory access attempt, "lower_aperture" and "upper_aperture" may refer to the lower and upper address boundaries, respectively, in the aperture region of the graphics memory assigned to the VM in question, and "lower_gmadr" and "upper_gmadr" may refer to the lower and upper boundaries, respectively, in the non-aperture region of the graphics memory.

In one example, the hardware boundary checker 1462 only checks accesses from the graphics modules 1466. In such a case, the check of host processor accesses (e.g., through aperture) may be conducted using an EPT of the VMM, as already noted.

In another implementation, the hardware scan may verify the command against multiple aperture segments and multiple non-aperture segments in the assigned address space. Thus, the boundary checker 1462 might use multiple sets of lower/upper pair address registers to support multiple segments of aperture/gmadr regions as follows.

```
{
For (i=0; i<num1; i++)
    If ((GMA>=lower_aperture[i])&&(GMA<upper_aperture[i]),
    access OK;
    If (i==num1)
        For (i=0; i<num2; i++)
            If ((GMA>=lower_gmadr[i])&&(GMA<upper_gmadr[i])),
            access
OK;
    If (i==num2)
        access is denied.
}
```

Figure 15:
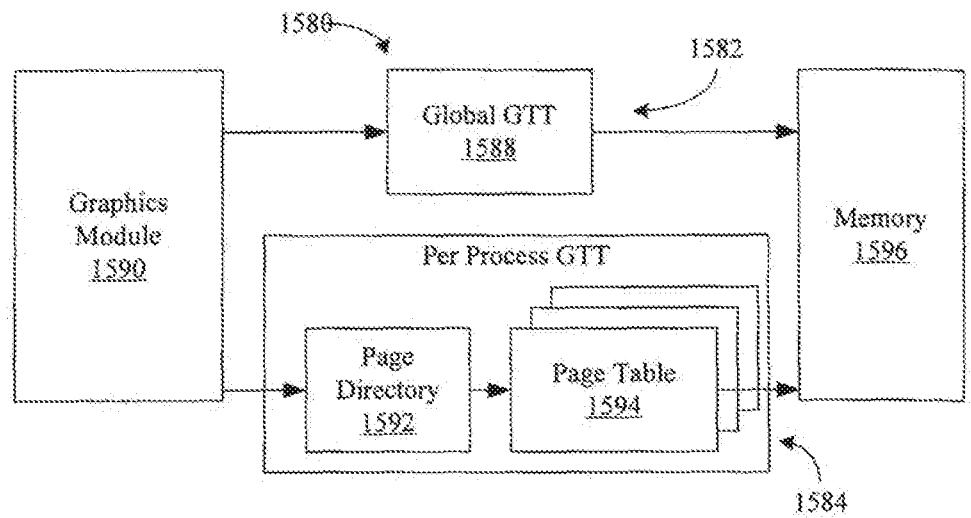
FIGS. 15 and 16 are block diagrams of an example of a per process graphics virtualization approach according to an embodiment.

FIG. 15 shows a per process graphics virtualization environment 1580. In this regard, GTT address space partitioning as described herein may co-exist with per process GTT (PPGTT) based full address space switches. In general, a PPGTT address space may be designed for massive rendering workload usage under current process contexts and may be unable or not suitable to be used as a global address space for performance and security reasons. Although other embodiments are considered, the environment 1580 may include two primary data paths, such as a render data path and a display data path.

For example, the environment 1580 may represent a graphics data path in an advanced scheduler model, wherein, an advanced scheduler may be part of an OS or a graphics VM, such as the VMs 1510 (FIG. 1). The illustrated environment 1580 includes a display path 1582 and a render path 1584, wherein a graphics module 1590 may use graphics memory addresses to access data. The graphics module 1590 may include, for example, rendering engines, media (e.g., audio and video) engines, GPGPU (general purpose GPU)

engines, and so forth. The graphics memory addresses may be translated to system memory addresses by a global GTT 1588. The graphics module 1590 may also use a PPGTT including a page directory 1592 and a page table 1594 to translate graphics memory addresses to physical addresses, depending on the addressing mode the command uses. Thus, the GTT translated address space, including aperture regions, may be accessed by the GPU as a frame buffer and/or used for other rendering engine purposes. Alternatively, the PPGTT translated address space may also be used as a frame buffer.

Figure 16:
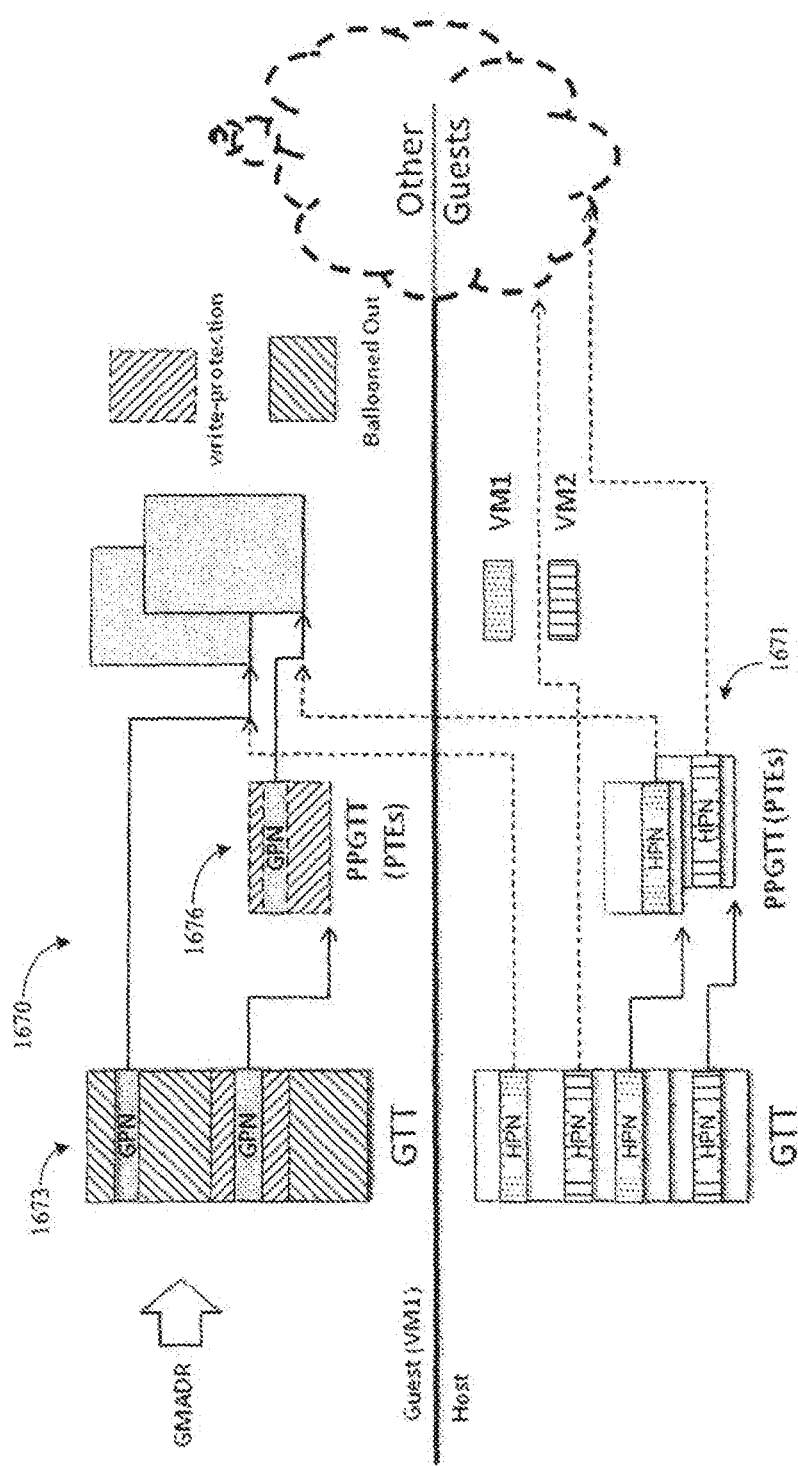

Accordingly, FIG. 16 demonstrates a virtualization approach 1670 in which the mapping of the PPGTT may not be required to be present all the time (e.g., when the context is "scheduled out"), or may be dynamically switched between guest PPGTTs. In one example, each PPGTT entry includes a page directory index into a page directory (e.g., page table base, part of the GTT), a page table index into a page table (e.g., page address, part of system memory), and an offset into a page in memory (e.g., final address). In such a case, the page directory index and the page table index may constitute the system address, a guest page number (GPN) from the guest's perspective and a host page number (HPN) from the host's perspective. Thus, the illustrated approach 1670 demonstrates that a PPGTT 1676 may be identified, a shadow PPGTT 1671 may be maintained for page table entries (PTEs), and a partitioned GTT 1673 may be maintained for aperture regions and page directory entries (PDEs) of the PPGTT 1676.

Figure 17:
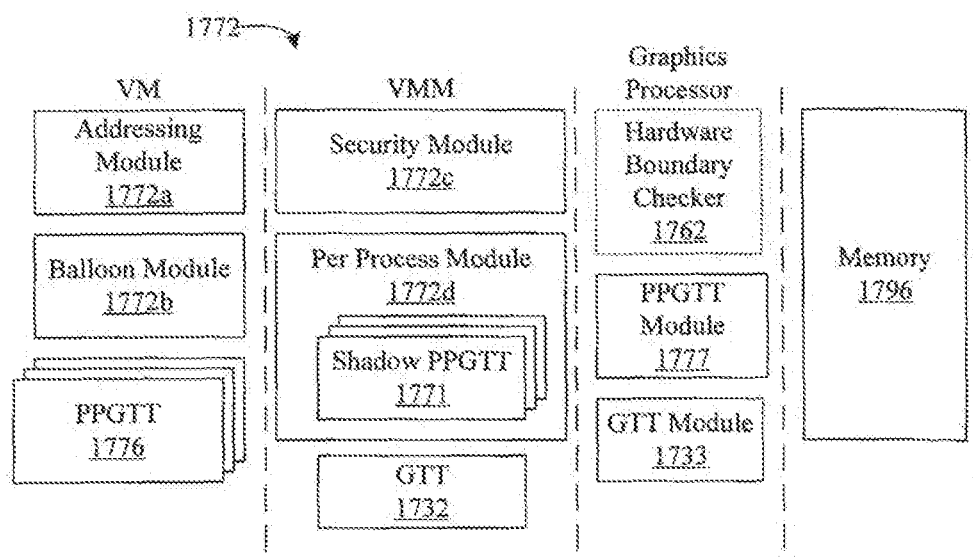
FIG. 17 is a block diagram of an example of a logic architecture according to an embodiment.

Turning now to FIG. 17, a logic architecture 1772 (1772*a*-1772*d*) is shown. The logic architecture 1772 may generally implement one or more aspects of the method 1744 (FIG. 3), and may function as the efficiency logic 1722 (FIG. 1), already discussed. Accordingly, an addressing module 1772*a* (e.g., various applications seeking access to graphics memory) may identify an assigned address space of a VM, wherein the assigned address space is to be associated with a graphics memory. The logic architecture 1772 may also include a balloon module 1772*b* to balloon a remaining address space that is not assigned to the VM. As already discussed, the view of the graphics memory address space by the VM may be identical to the view of the VMM address space.

In one example, the logic architecture 1772 also includes a security module 1772*c* that identifies commands from the VM, uses the VMM to conduct scans of the commands and generates an alert (e.g., host processor/CPU interrupt), and or stops executing the command, if the commands attempt to access the remaining address space that is not assigned to the VM (e.g., the ballooned out address space). Once the scan is complete, the VMM may issue the command to the hardware device for execution.

The VMM portion of the illustrated logic architecture 1772 also includes a per process module 1772*d* that identifies a PPGTT 1776, maintains a shadow PPGTT 1771 for page table entries (PTEs), and maintains a partitioned GTT 1732 for aperture regions and page directory entries (PDEs) of the PPGTT 76.

A graphics processor may alternatively use a hardware boundary checker 1762 to conduct the scans of the commands, wherein the hardware boundary checker 1762 may generate an alert and/or stop executing the command if one or more of the commands attempt to access the remaining address space. Moreover, the scan may verify the commands against multiple aperture segments and multiple non-aperture segments in the assigned address space.

The graphics processor may also include a PPGTT module 1777 and a GTT module 1733 to support the address translation, wherein the scan by the hardware boundary checker 1762 may be conducted subsequent to the address translation.

Figure 18:
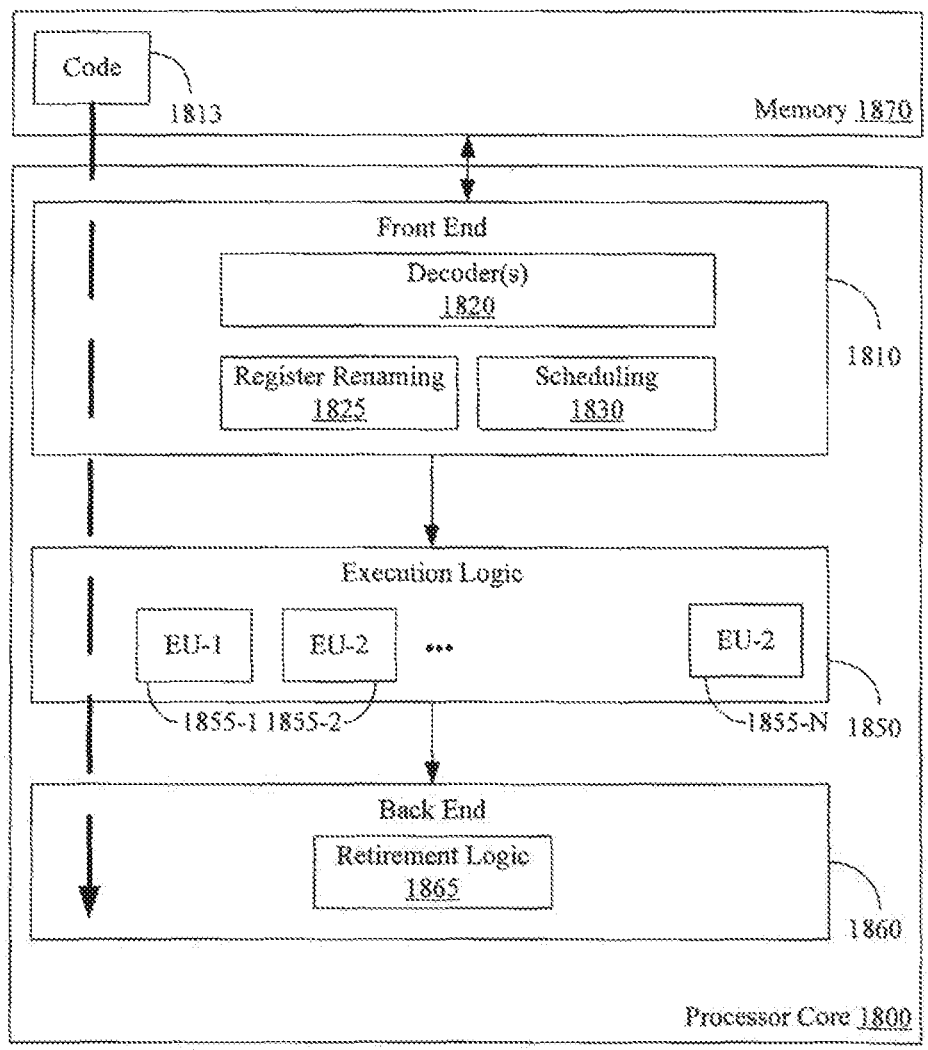
FIG. 18 is a block diagram of an example of a processor according to an embodiment.

FIG. 18 illustrates a processor core 1800 according to one embodiment. The processor core 1800 may be the core for any type of processor, such as a micro-processor, an embedded processor, a digital signal processor (DSP), a GPU, a network processor, or other device to execute code. Although only one processor core 1800 is illustrated in FIG. 8, a processing element may alternatively include more than one of the processor core 1800 illustrated in FIG. 8. The processor core 1800 may be a single-threaded core or, for at least one embodiment, the processor core 1800 may be multithreaded in that it may include more than one hardware thread context (or "logical processor") per core.

FIG. 18 also illustrates a memory 1870 coupled to the processor 1800. The memory 1270 may be any of a wide variety of memories (including various layers of memory hierarchy) as are known or otherwise available to those of skill in the art. The memory 1870 may include one or more code 1813 instruction(s) to be executed by the processor 1800 core, wherein the code 1813 may implement one or more aspects of the method 1344 (FIG. 3), already discussed. The processor core 1800 follows a program sequence of instructions indicated by the code 1813. Each instruction may enter a front end portion 1810 and be processed by one or more decoders 1820. The decoder 1820 may generate as its output a micro operation such as a fixed width micro operation in a predefined format, or may generate other instructions, microinstructions, or control signals which reflect the original code instruction. The illustrated front end 1810 also includes register renaming logic 1825 and scheduling logic 1830, which generally allocate resources and queue the operation corresponding to the convert instruction for execution.

The processor 1800 is shown including execution logic 1850 having a set of execution units 1855-1 through 1855-N. Some embodiments may include a number of execution units dedicated to specific functions or sets of functions. Other embodiments may include only one execution unit or one execution unit that can perform a particular function. The illustrated execution logic 1850 performs the operations specified by code instructions.

After completion of execution of the operations specified by the code instructions, back end logic 1860 retires the instructions of the code 1813. In one embodiment, the processor 1800 allows out of order execution but requires in order retirement of instructions. Retirement logic 1865 may take a variety of forms as known to those of skill in the art (e.g., re-order buffers or the like). In this manner, the processor core 1800 is transformed during execution of the code 1813, at least in terms of the output generated by the decoder, the hardware registers and tables utilized by the register renaming logic 1825, and any registers (not shown) modified by the execution logic 1850.

Although not illustrated in FIG. 18, a processing element may include other elements on chip with the processor core 1800. For example, a processing element may include memory control logic along with the processor core 1800. The processing element may include I/O control logic and/or may include I/O control logic integrated with memory control logic. The processing element may also include one or more caches.

Figure 19:
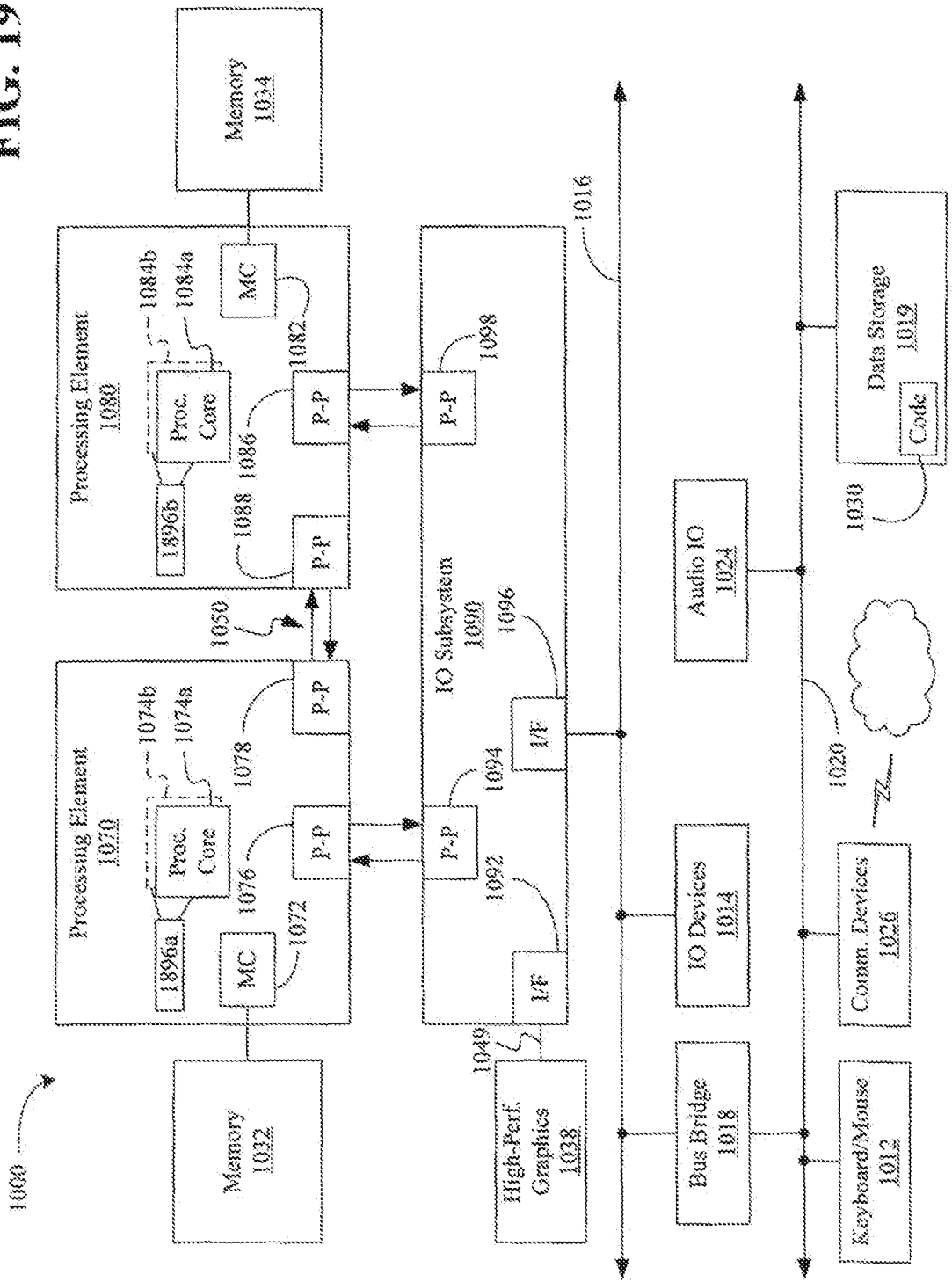
FIG. 19 is a block diagram of an example of a system according to an embodiment.

Referring now to FIG. 19, shown is a block diagram of a system 1900 embodiment in accordance with an embodiment. Shown in FIG. 19 is a multiprocessor system 1900 that includes a first processing element 1970 and a second processing element 1980. While two processing elements 1970 and 1080 are shown, it is to be understood that an embodiment of the system 1900 may also include only one such processing element.

The system 1900 is illustrated as a point-to-point interconnect system, wherein the first processing element 1970 and the second processing element 1080 are coupled via a point-to-point interconnect 1950. It should be understood that any or all of the interconnects illustrated in FIG. 19 may be implemented as a multi-drop bus rather than point-to-point interconnect.

As shown in FIG. 19, each of processing elements 1970 and 1980 may be multicore processors, including first and second processor cores (i.e., processor cores 1974a and 1974b and processor cores 1984a and 1984b). Such cores 1974, 1974b, 1984a, 1984b may be configured to execute instruction code in a manner similar to that discussed above in connection with FIG. 18.

Each processing element 1970, 1980 may include at least one shared cache 1896a, 1896b. The shared cache 1896a, 1896b may store data (e.g., instructions) that are utilized by one or more components of the processor, such as the cores 1974a, 1974b and 1984a, 1984b, respectively. For example, the shared cache 1996a, 1996b may locally cache data stored in a memory 1932, 1934 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1970, 1980, it is to be understood that the scope of the embodiments are not so limited. In other embodiments, one or more additional processing elements may be present in a given processor. Alternatively, one or more of processing elements 1970, 1980 may be an element other than a processor, such as an accelerator or a field programmable gate array. For example, additional processing element(s) may include additional processors(s) that are the same as a first processor 1970, additional processor(s) that are heterogeneous or asymmetric to processor a first processor 1970, accelerators (such as, e.g., graphics accelerators or digital signal processing (DSP) units), field programmable gate arrays, or any other processing element. There can be a variety of differences between the processing elements 1970, 1980 in terms of a spectrum of metrics of merit including architectural, micro architectural, thermal, power consumption characteristics, and the like. These differences may effectively manifest themselves as asymmetry and heterogeneity amongst the processing elements 1970, 1980. For at least one embodiment, the various processing elements 1970, 1980 may reside in the same die package.

The first processing element 1970 may further include memory controller logic (MC) 1972 and point-to-point (P-P) interfaces 1976 and 1978. Similarly, the second processing element 1980 may include a MC 1982 and P-P interfaces 11986 and 1988. As shown in FIG. 19, MC's 1972 and 1982 couple the processors to respective memories, namely a memory 1932 and a memory 1934, which may be portions of main memory locally attached to the respective processors. While the MC 1972 and 1982 is illustrated as integrated into the processing elements 1970, 1980, for alternative embodiments the MC logic may be discrete logic outside the processing elements 1970, 1980 rather than integrated therein.

The first processing element 1970 and the second processing element 1080 may be coupled to an I/O subsystem 1990 via P-P interconnects 1076 1086, respectively. As shown in FIG. 9, the I/O subsystem 1990 includes P-P interfaces 1994 and 1998. Furthermore, I/O subsystem 1990 includes an interface 1992 to couple I/O subsystem 1990 with a high performance graphics engine 1938. In one embodiment, the graphics engine 1938 includes a GPU and a bus 1949 may be used to couple the graphics engine 1938 to the I/O subsystem 1990. Alternately, a point-to-point interconnect may couple these components.

In turn, I/O subsystem 1990 may be coupled to a first bus 1916 via an interface 1996. In one embodiment, the first bus 1916 may be a Peripheral Component Interconnect (PCI) bus, or a bus such as a PCI Express bus or another third generation I/O interconnect bus, although the scope of the embodiments are not so limited.

As shown in FIG. 19, various I/O devices 1914 (e.g., cameras) may be coupled to the first bus 1916, along with a bus bridge 1918 which may couple the first bus 1916 to a second bus 1920. In one embodiment, the second bus 1920 may be a low pin count (LPC) bus. Various devices may be coupled to the second bus 1920 including, for example, a keyboard/mouse 1912, network controllers/communication device(s) 1926 (which may in turn be in communication with a computer network), and a data storage unit 1919 such as a disk drive or other mass storage device which may include code 1930, in one embodiment. The code 1930 may include instructions for performing embodiments of one or more of the methods described above. Thus, the illustrated code 1930 may implement the method 44 (FIG. 3), and may be similar to the code 213 (FIG. 8), already discussed. Further, an audio I/O 1924 may be coupled to second bus 1920.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include an apparatus to manage virtual machines, comprising an addressing module to identify an assigned address space of a virtual machine (VM), wherein the assigned address space is to be associated with a graphics memory address space. The apparatus may also include a balloon module to balloon a remaining address space that is not assigned to the VM, wherein a view of the graphics memory address space by the VM is identical to a virtual machine monitor (VMM) address space.

Example 2 may include the apparatus of Example 1, further including a security module to identify a command from the VM, use the VMM to conduct a scan of the command and generate an alert if the command attempts to access the remaining address space that is not assigned to the VM.

Example 3 may include the apparatus of Example 1, further including a security module to identify a command from one or more of the VM or a graphics module, the security module having a hardware boundary checker to conduct a scan of the command and generate an alert if the command attempts to access the remaining address space.

Example 4 may include the apparatus of Example 3, wherein the scan is to verify the command against multiple aperture segments and multiple non-aperture segments in the assigned address space.

Example 5 may include the apparatus of Example 1, further including a per process module to identify a per process graphics translation table (PPGTT), maintain a shadow PPGTT for page table entries (PTEs), and maintain a partitioned graphics translation table (GTT) for aperture regions and page directory entries (PDEs) of the PPGTT.

Example 6 may include the apparatus of Example 1, further including a graphics translation table (GTT) to map a command address in the assigned address space to a physical address in the graphics memory.

Example 7 may include the apparatus of any one of Examples 1 to 6, wherein the assigned address space is to include an aperture region and a non-aperture region.

Example 8 may include a method of managing virtual machines, comprising identifying an assigned address space of a VM, wherein the assigned address space is associated with a graphics memory address space. The method may also provide for ballooning a remaining address space in the graphics memory that is not assigned to the VM, wherein a view of the graphics memory address space by the VM is identical to a virtual machine monitor (VMM) address space.

Example 9 may include the method of Example 8, further including identifying a command from the VM, and using the VMM to conduct a scan of the command and generate an alert if the command attempts to access the remaining address space that is not assigned to the VM.

Example 10 may include the method of Example 8, further including identifying a command from one or more of the VM or a graphics module, and using a hardware boundary checker to conduct a scan of the command and generate an alert if the command attempts to access the remaining address space.

Example 11 may include the method of Example 10, wherein the scan is to verify the command against multiple aperture segments and multiple non-aperture segments in the assigned address space.

Example 12 may include the method of Example 8, further including identifying a per process graphics translation table (PPGTT), maintaining a shadow PPGTT for page table entries (PTEs), and maintaining a partitioned graphics translation table (GTT) for aperture regions and page directory entries (PDEs) of the PPGTT.

Example 13 may include the method of Example 8, wherein a graphics translation table (GTT) maps the assigned address space to a physical address in the graphics memory.

Example 14 may include the method of any one of Examples 8 to 13, wherein the assigned address space includes an aperture region and a non-aperture region.

Example 15 may include at least one computer readable storage medium comprising a set of instructions which, if executed by a computing device, cause the computing device to identify an assigned address space of a VM, wherein the assigned address space is to be associated with a graphics memory address space. The instructions, if executed, may also cause a computing device to balloon a remaining address space that is not assigned to the VM, wherein a view of the graphics memory address space by the VM is identical to a virtual machine monitor (VMM) address space.

Example 16 may include the at least one computer readable storage medium of Example 15, wherein the instructions, if executed, cause a computing device to identify a command from the VM, and use the VMM to conduct a scan of the command and generate an alert if the command attempts to access the remaining address space that is not assigned to the VM.

Example 17 may include the at least one computer readable storage medium of Example 15, wherein the instructions, if executed, cause a computing device to identify a command from one or more of the VM or a graphics module, and use a hardware boundary checker to conduct a scan of the command and generate an alert if the command attempts to access the remaining address space.

Example 18 may include the at least one computer readable storage medium of Example 17, wherein the scan is to verify the command against multiple aperture segments and multiple non-aperture segments in the assigned address space.

Example 19 may include he at least one computer readable storage medium of Example 15, wherein the instructions, if executed, cause a computing device to identify a per process graphics translation table (PPGTT), maintain a shadow PPGTT for page table entries (PTEs), and maintain a partitioned graphics translation table (GTT) for aperture regions and page directory entries (PDEs) of the PPGTT.

Example 20 may include the at least one computer readable storage medium of Example 15, wherein a graphics translation table (GTT) is to map the assigned address space to a physical address space in the graphics memory.

Example 21 may include the at least one computer readable storage medium of any one of Examples 15 to 20, wherein the assigned address space is to include an aperture region and a non-aperture region.

Example 22 may include an apparatus to manage virtual machines, comprising means for performing the method of any one of Examples 8 to 14.

Apparatus and Method for Managing a Virtual Graphics Processor Unit (GPU)

As described above, there are currently two techniques which support efficient GFX virtualization, referred to as "pass-through" and "mediate pass-through." Pass-through technologies are widely used with input/output memory management unit (IOMMU) technology such as Intel Virtualization Technology for Directed I/O (VT-d) and/or Single Root I/O Virtualization (SRIOV), where the hardware can generate multiple instances of PCI express (PCIe) functions so that each guest can directly access the runtime hardware resources (e.g., memory mapped IO (MMIO) and direct memory access (DMA)). For example, IOMMU technology will remap the guest physical DMA address to the host. However, SRIOV-capable GFX devices require extensive hardware modification and/or circuit budget and, as a result, examples of this technology have not appeared in any significant devices or platforms.

Mediate pass-through uses the software to emulate the access of less performance-critical resources (e.g., MMIO registers) from the guest, but to pass-through performance-critical resource access, such as aperture and rendering commands. For example, guest aperture access may go directly to hardware as described above, and the guest rendering commands may be directly executed by the GPU. In addition, there are two implementations of mediate pass-through provided by different guest software stacks: a command-level forwarding based implementation such as the VMWare virtual SVGA (vSVGA), and MMIO-level trap-and-forwarding based approach, such as XenGT developed by Intel™. The architectures are based on Intel GEN hardware, but the same underlying techniques are applicable to other GPU architectures.

To reuse guest commands for direct hardware execution, there is an additional challenge. The graphic memory addresses (GM_ADDR) used in guest commands need to be scanned and converted to host GM_ADDRs. Address space ballooning (ASB) is discussed above for the GGTT (global graphics translation table)-mapped address space, where each guest may allocate a portion of the address space, at very beginning, and use that portion of address space only to construct commands for direct execution. Because a portion of the address space is allocated ahead of time, ASB eliminates the need to perform guest GM_ADDR conversion which involves scanning/reading of the guest graphics memory, and updating of the graphics memory, which typically requires a cache flush operation resulting in a performance hit.

However, ASB poses additional challenges to VM migration. The ballooned address space may be different in the target VM compared with that in source VM, and therefore the migration may fail. A simple solution is to remove the ASB, and reuse the address remapping with shadow page tables (e.g., GGTT and PPGGTT). However, this requires scanning and translation of the address from the guest GM_ADDR to the host GM_ADDR all the time, which results in a significant performance penalty.

One embodiment of the invention employs a hybrid solution to dynamic switching between ASB and address remapping. If the target VM can allocate the same address space, the scan and conversion of the guest CMDs can be skipped for performance (i.e., ASB is utilized). Otherwise, this embodiment of the invention falls back to address remapping with scan and conversion of the guest CMDs (incurring a performance penalty).

In addition, one embodiment of the invention employs resource pool management, attempting to find a target node with the desired resource (i.e., to create an identical mapping here). This works well for IT virtualization platforms where the physical node and the VM are deployed universally by the IT department, in a private cloud (e.g., such as Huawei IT VM).

Another embodiment of the invention employs a best effort ASB implementation for a mixed hybrid solution which distinguishes between the identically-mapped guest GM_ADDR space and the non-identical host GM_ADDR space. For the identically mapped GM_ADDRs, translation does not need to be performed because ASB may be used. Consequently, cache flushes can be avoided and less access to UC memory. For those non-identically mapped GM_ADDRs, address remapping may be used with scan and conversion of the guest CMDs (with a performance penalty).

Figure 20:
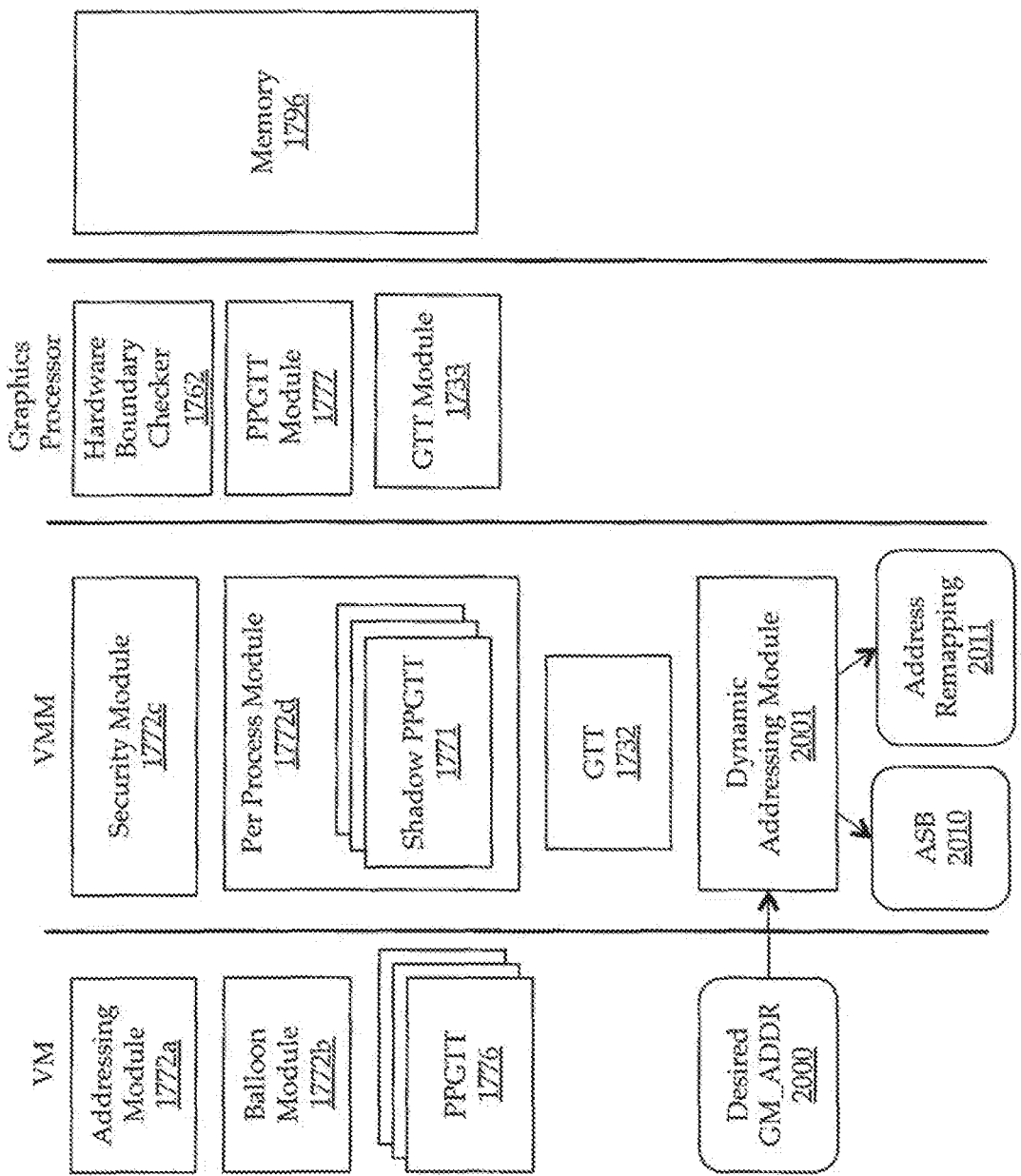
FIG. 20 illustrates one embodiment of an architecture including a dynamic addressing module.

As illustrated in FIG. 20, one embodiment of the invention includes a dynamic addressing module 2001 which implements these techniques. In particular, the dynamic addressing module 2001 attempts to partition the address space such that the desired guest GM_ADDR space 2000 maps to the same GM_ADDR space in the host. In such a case, ASB 2010 techniques may be used and scan/conversion of the guest commands may be skipped, resulting in higher performance. If, however, some or all of the desired guest GM_ADDR space 2000 is not available, then the dynamic addressing module 2001 will perform a non-identical mapping between the guest GM_ADDR space and host GM_ADDR space. In such a case, the dynamic addressing module 2001 will choose to perform address remapping 2011 in which the VMM must scan and convert the graphic address (GM_ADDR) in guest commands. Note, however, that while the ASB techniques may not be employed, the resource ballooning mechanism described herein may be maintained.

In one embodiment, the dynamic addressing module 2001 may take a mixed hybrid approach in which it maps certain portions of the guest GM_ADDR space to use ASB 2010 while other portions of the guest GM_ADDR space use address remapping techniques 2011. For example, the dynamic addressing module 2001 may map the desired guest GM_ADDR space to the same GM_ADDR space where it is possible to do so (e.g., where the desired portions of the host GM_ADDR space are free) and revert to address remapping techniques for the remainder of the GM_ADDR space which is not identically mapped.

Figure 21:
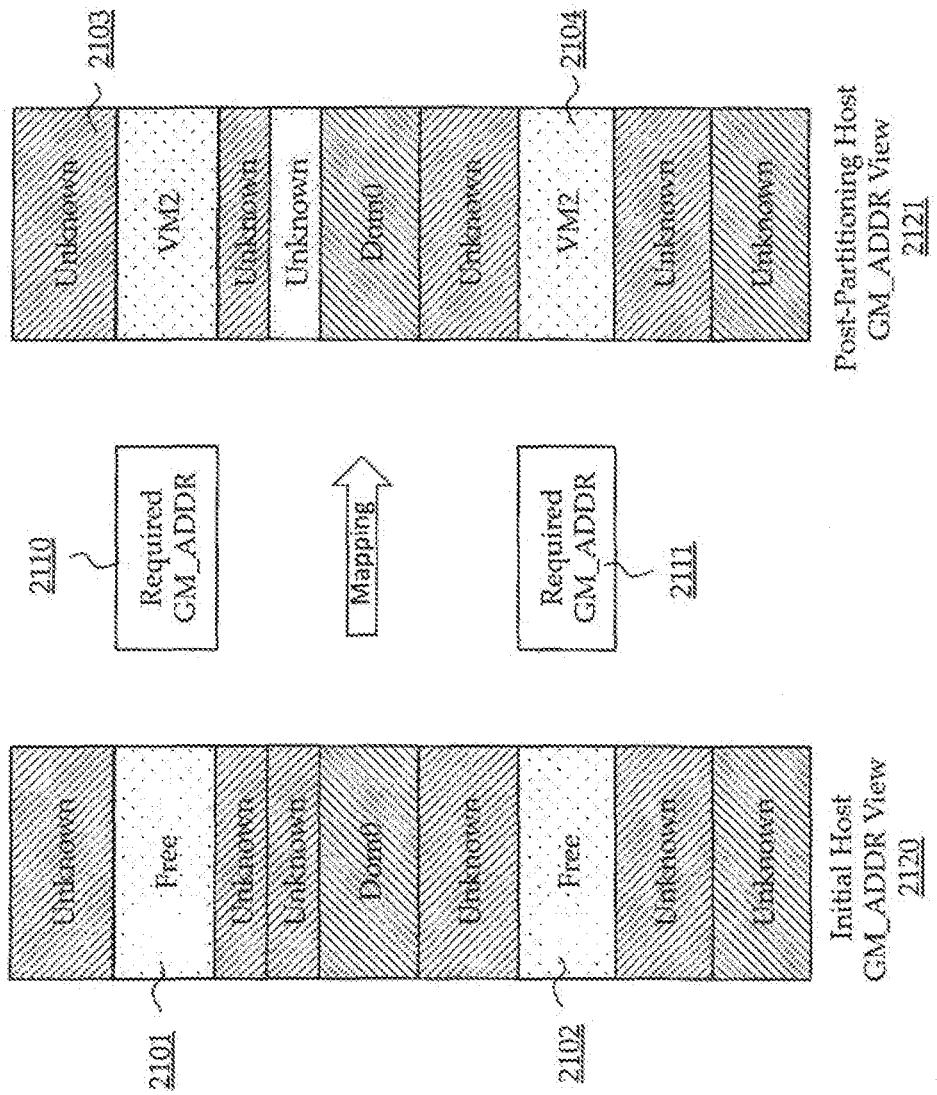
FIG. 21 illustrates a mapping in which an address space required by a virtual machine is mapped to matching free address spaces of a host.
Figure 22:
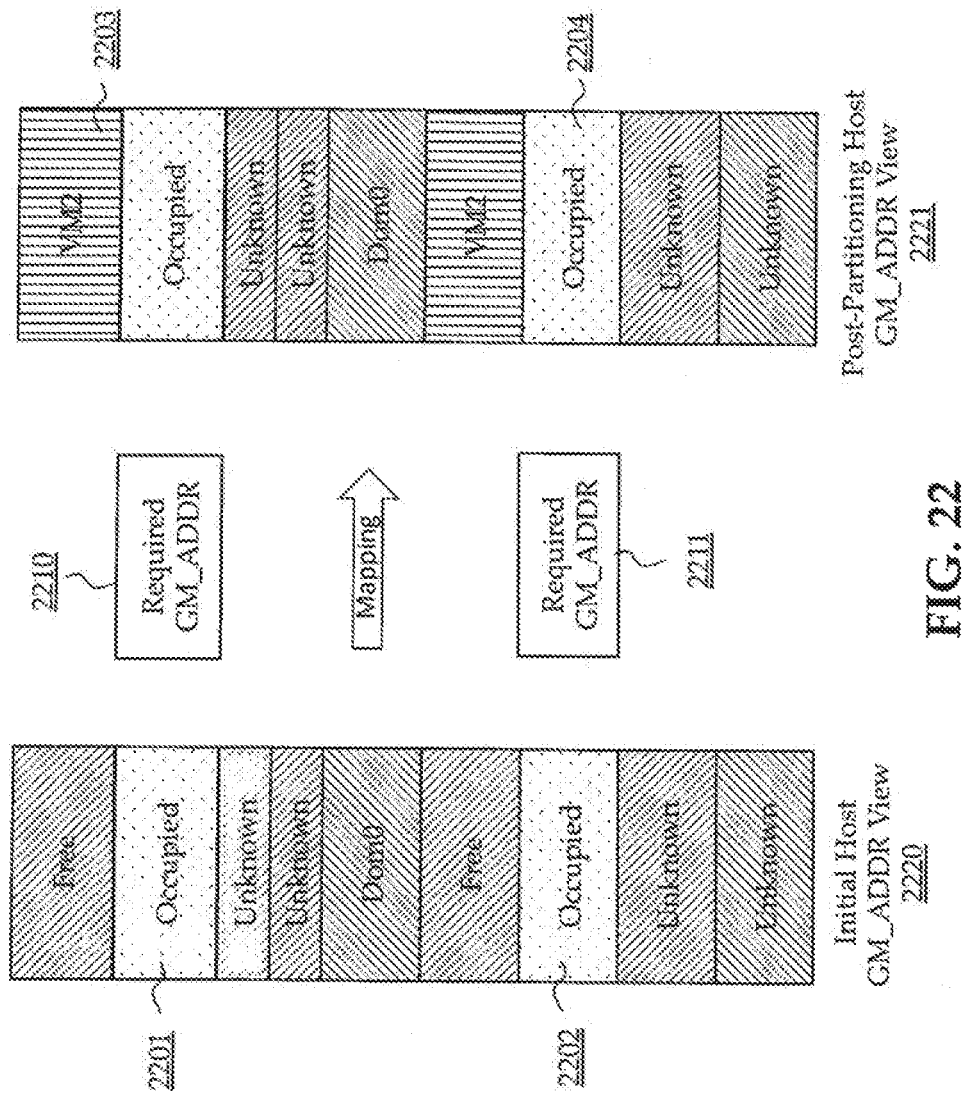
FIG. 22 illustrates a mapping in which portions of an address space required by the virtual machine are mapped to non-matching free address spaces of a host.
Figure 23:
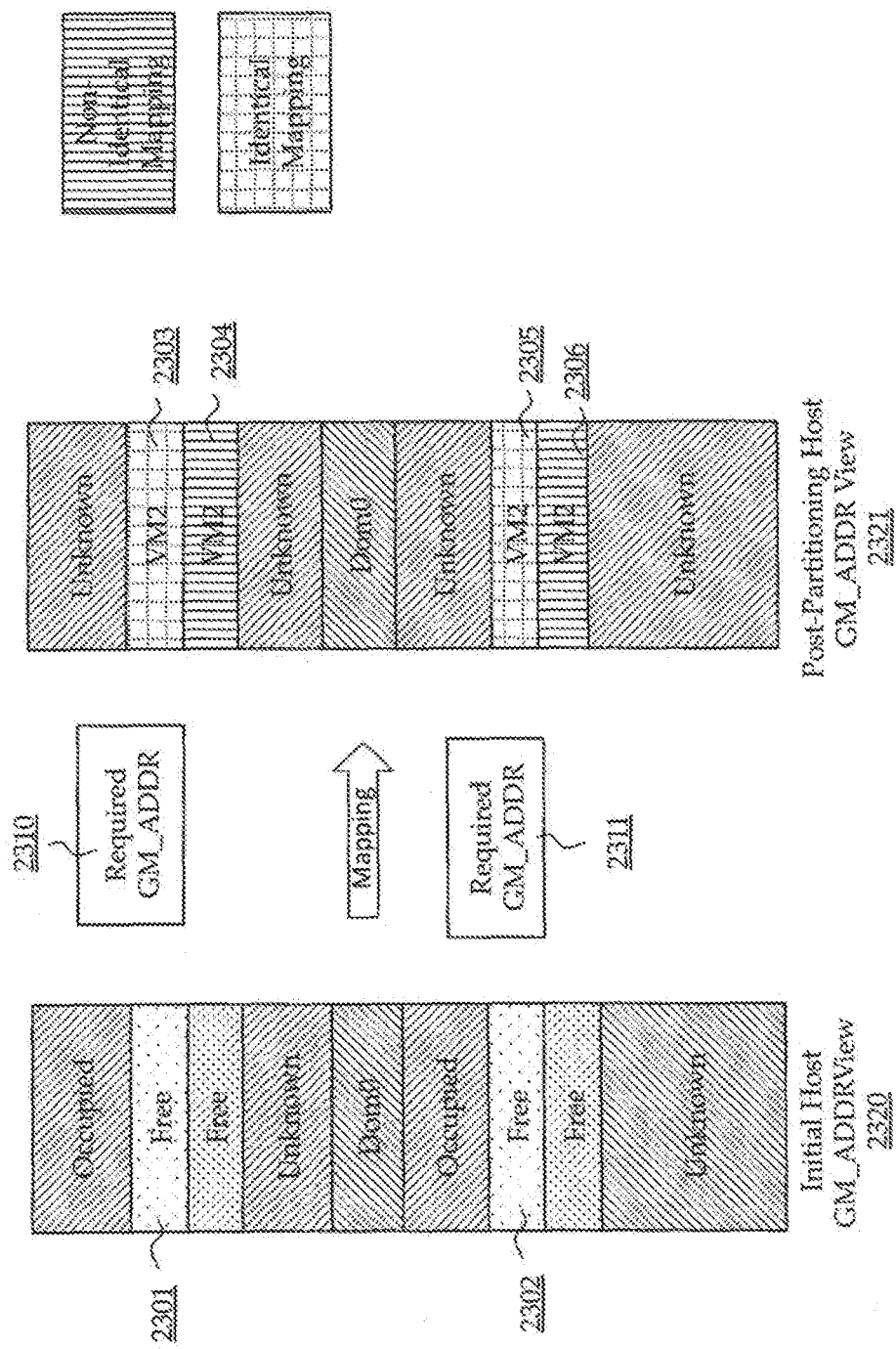
FIG. 23 illustrates a mapping in which portions of an address space required by the virtual machine are mapped to matching free address spaces of a host.

The above techniques are illustrated in greater detail in FIGS. 21-23. In particular, FIG. 21 shows an example in which free space 2101-2102 in the initial host GM_ADDR view 2120 can be mapped to the required GM_ADDR space 2110-2111. As such, the dynamic addressing module 2001 maps the required GM_ADDR space 2110-2111 to the free space 2101-2102, resulting in a post-partitioning host GM_ADDR view 2121 in which the matching address space 2103-2104 is mapped to the virtual machine (VM2 in the example). As such, ASB techniques may be used, resulting in improved performance.

FIG. 22 shows an alternate example in which the free space 2201-2202 in the initial host GM_ADDR view cannot be mapped to the required GM_ADDR space 2210-2211. As such, the dynamic addressing module 2001 cannot match the required GM_ADDR space 2210-2211 to the free space 2201-2202, resulting in a post-partitioning host GM_ADDR view 2221 in which there is a mismatch between the address space 2203-2204 mapped to the virtual machine and the required GM_ADDR space 2210-2211. As such, in this embodiment, address remapping techniques must be employed including scan/conversion of guest commands.

FIG. 23 shows another example in which only a portion of the required GM_ADDR space 2310-2311 can be mapped to the free space 2301-2302 in the initial host GM_ADDR view 2320. In particular, in this embodiment, the dynamic addressing module 2001 performs mapping to construct a post-partitioning host GM_ADDR view 2321 in which a first portion 2303, 2305 of the GM_ADDR view 2321 is matched to a portion of the required GM_ADDR space 2310-2311 and a second portion 2304, 2306 of the GM_ADDR view 2321 is not matched to the required GM_ADDR space. Consequently, in this embodiment, ASB techniques may be employed for guest addresses corresponding to the first portion 2303, 2305 of the GM_ADDR view 2321 and address remapping techniques may be employed for the remainder of the guest addresses (e.g., for those portions which do not match, the VMM may perform scan/conversion of guest commands).

Figure 24:
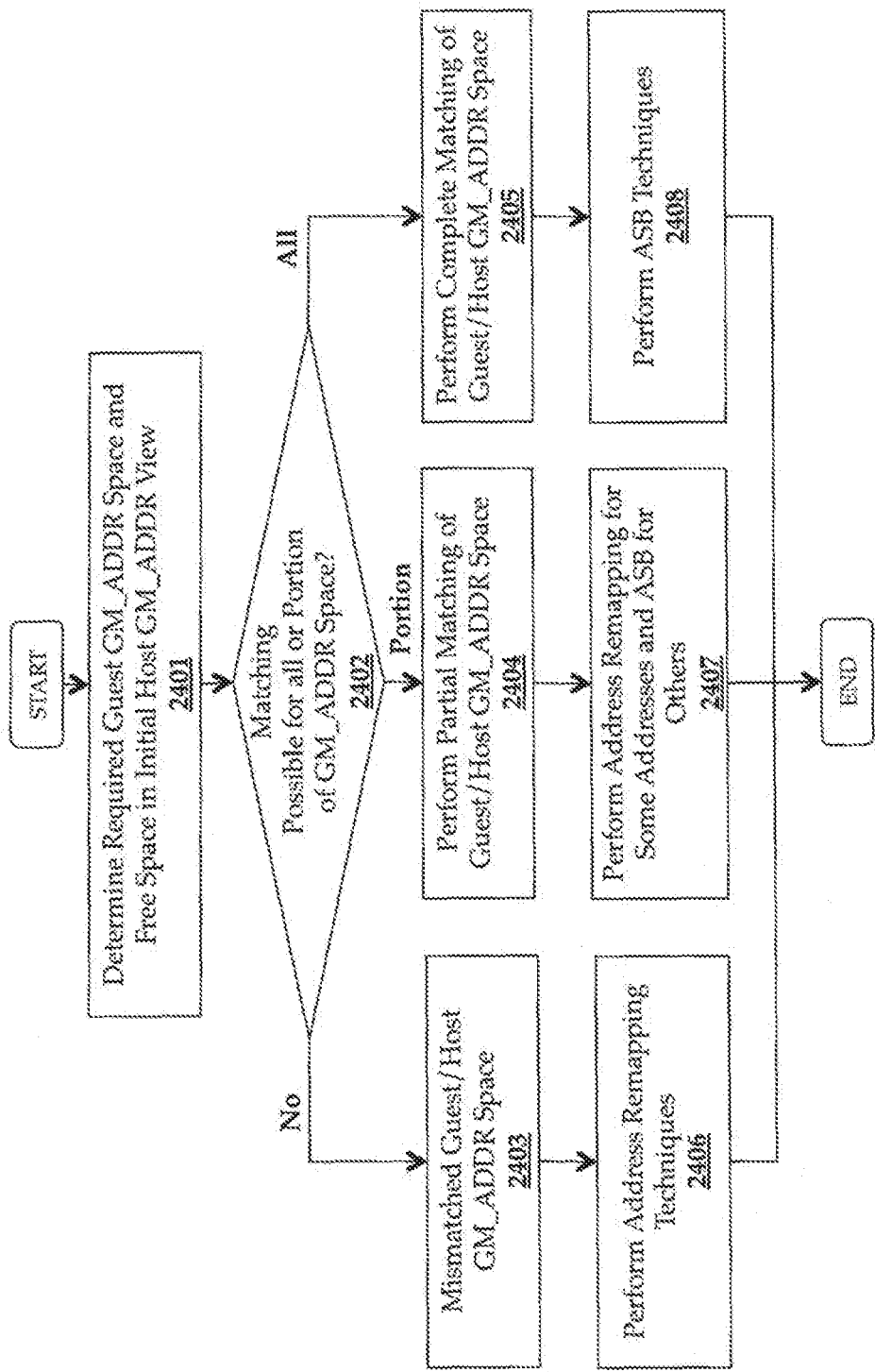
FIG. 24 illustrates a method in accordance with one embodiment of the invention.

FIG. 24 illustrates a method in accordance with one embodiment of the invention. The method may be implemented within the context of the system architectures described above, but is not limited to any particular system architecture.

At 2401, the required guest GM_ADDR space is determined as is the free space in the initial (pre-allocated) host GM_ADDR view. At 2402, a determination is made as to whether all or a portion of the required guest GM_ADDR space can be matched to the free space in the host view. If none of the GM_ADDR space can be matched, then at 2403 a partitioning such as illustrated in FIG. 22 is performed in which there is a mismatch between the guest/host GM_ADDR spaces. Consequently, at 2406, address remapping techniques are performed (e.g., requiring scan/conversion of guest commands) in lieu of ASB.

If all of the required guest GM_ADDR space can be matched, then at 2405 an allocation such as illustrated in FIG. 21 is performed in which there is complete matching of the guest/host GM_ADDR space. As such, at 2408 ASB techniques may be performed in lieu of address remapping, resulting in improved performance.

If only a portion of the guest GM_ADDR space can be matched, then at 2404 an allocation such as illustrated in FIG. 23 is performed in which portions of the required guest GM_ADDR space are matched to the host GM_ADDR space while other portions are mismatched. Consequently, at 2408, the matched portions may employ ASB techniques while the mismatched portions may employ address remapping techniques.

The end result of the foregoing techniques is that the best available performance can be achieved. That is, ASB is used wherever it is possible to do so (e.g., where the guest/host addresses can be matched) while the system will fall back to address remapping whenever ASB cannot be used.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   a memory to provide address spaces of a host;
   dynamic addressing circuitry to determine whether the host can allocate all portions of an address space required by a virtual machine;
   balloon module circuitry to perform address space ballooning (ASB) techniques for the address space required by the virtual machine only if all portions of the address space required by the virtual machine can be mapped to matching free address spaces of the host, such that all addresses in the address space required by the virtual machine are mapped to same addresses in the matching free address spaces of the host without address translation; and
   address remapping circuitry to perform address remapping techniques for the address space required by the virtual machine if some or all portions of the address space required by the virtual machine cannot be mapped to matching free address spaces of the host.

2. The apparatus as in claim 1, wherein ASB techniques comprise ballooning a remaining address space that is not assigned to the virtual machine.

3. The apparatus of claim 2, further including a security module to identify a command from the virtual machine, conducting a scan of the command and generating an alert if the command attempts to access the remaining address space that is not assigned to the virtual machine.

4. The apparatus as in claim 1, wherein if all portions of the address space required by the virtual machine can be mapped to matching free address spaces of the host, then performing ASB techniques for all of the address space required by the virtual machine.

5. The apparatus as in claim 1, wherein the host comprises a virtual machine monitor (VMM) to provide a virtualized execution environment for the virtual machine.

6. The apparatus as in claim 5 further comprising:
   a graphics translation table (GTT) usable by the VMM to map addresses in a graphics memory address space, including those portions of the address space required by the virtual machine, to addresses in a physical address space.

7. The apparatus of claim 1, further including a security module to identify a command from the virtual machine, the security module having a hardware boundary checker to conduct a scan of the command and generate an alert if the command attempts to access the remaining address space, wherein the scan is to verify the command against multiple aperture segments and multiple non-aperture segments in the assigned address space.

8. The apparatus of claim 1, further including a per process module to identify a per process graphics translation table (PPGTT), maintain a shadow PPGTT for page table entries (PTEs), and maintain a partitioned graphics translation table (GTT) for aperture regions and page directory entries (PDEs) of the PPGTT.

9. The apparatus of claim 1, further including a graphics translation table (GTT) to map a command address in the address space required by the virtual machine to a physical address in a graphics memory.

10. A method for dynamically switching between address space ballooning (ASB) techniques and address remapping techniques in a host: determining whether the host can allocate all portions of an address space required by a virtual machine, the host comprising a memory to provide address spaces for the host; performing address ASB techniques for the address space required by the virtual machine only if all portions of the address space required by the virtual machine can be mapped to matching free address spaces of the host, such that all addresses in the address space required by the virtual machine are mapped to same addresses in the matching free address spaces of the host without address translation; and performing address remapping techniques for the address space required by the virtual machine if some or all portions of the address space required by the virtual machine cannot be mapped to matching free address spaces of the host.

11. The method as in claim 10, wherein ASB techniques comprise ballooning a remaining address space that is not assigned to the virtual machine.

12. The method as in claim 11, further comprising:
identifying a command from the virtual machine;
conducting a scan of the command; and
generating an alert if the command attempts to access the remaining address space that is not assigned to the virtual machine.

13. The method as in claim 10, wherein the host comprises a virtual machine monitor (VMM) to provide a virtualized execution environment for the virtual machine.

14. The method as in claim 13, further comprising:
using a graphics translation table (GTT) by the VMM to map addresses in a graphics memory address space, including those portions of the address space required by the virtual machine, to addresses in a physical address space.

15. The method of claim 10, further comprising:
identifying a command from the virtual machine with a hardware boundary checker to conduct a scan of the command and generate an alert if the command attempts to access the remaining address space, wherein the scan is to verify the command against multiple aperture segments and multiple non-aperture segments in the assigned address space.

16. The method of claim 10, further comprising:
mapping a command address in the address space required by the virtual machine to a physical address in a graphics memory using a graphics translation table (GTT).

17. A non-transitory machine-readable medium having program code stored thereon which, when executed by a machine, causes the machine to perform the operations of: determining whether a host can allocate all portions of an address space required by a virtual machine, the host comprising a memory to provide address spaces for the host; performing address ASB techniques for the address space required by the virtual machine only if all portions of the address space required by the virtual machine can be mapped to matching free address spaces of the host, such that all addresses in the address space required by the virtual machine are mapped to same addresses in the matching free address spaces of the host without address translation; and performing address remapping techniques for the address space required by the virtual machine if some or all portions of the address space required by the virtual machine cannot be mapped to matching free address spaces of the host.

18. The non-transitory machine-readable medium as in claim 17, wherein ASB techniques comprise ballooning a remaining address space that is not assigned to the virtual machine.

19. The non-transitory machine-readable medium as in claim 18,
wherein the operations further comprise:
identifying a command from the virtual machine;
conducting a scan of the command; and
generating an alert if the command attempts to access the remaining address space that is not assigned to the virtual machine.

20. The non-transitory machine-readable medium as in claim 17, wherein the host comprises a virtual machine monitor (VMM) to provide a virtualized execution environment for the virtual machine.

21. The non-transitory machine-readable medium as in claim 20,
wherein the operations further comprise:
using a graphics translation table (GTT) by the VMM to map addresses in a graphics memory address space, including those portions of the address space required by the virtual machine, to addresses in a physical address space.

22. The non-transitory machine-readable medium of claim 17,
wherein the operations further comprise:
identifying a command from the virtual machine with a hardware boundary checker to conduct a scan of the command and generate an alert if the command attempts to access the remaining address space, wherein the scan is to verify the command against multiple aperture segments and multiple non-aperture segments in the assigned address space.

23. The non-transitory machine-readable medium of claim 17,
wherein the operations further comprise:
mapping a command address in the address space required by the virtual machine to a physical address in a graphics memory using a graphics translation table (GTT).

* * * * *